United States Patent
Torres et al.

(10) Patent No.: US 10,575,372 B2
(45) Date of Patent: Feb. 25, 2020

(54) SYSTEM, APPARATUS, AND METHOD FOR COOKING USING RF OVEN

(71) Applicant: GOJI LIMITED, Hamilton (BM)

(72) Inventors: Eyal Torres, Savyon (IL); Daniel Selinger, Tel-Aviv (IL); Daniella Atzmony, Shoham (IL); Ginat Rachel Muginstein, Evern Yehuda (IL)

(73) Assignee: GOJI LIMITED, Hamilton (BM)

( * ) Notice: Subject to any disclaimer, the term of this patent is extended or adjusted under 35 U.S.C. 154(b) by 656 days.

(21) Appl. No.: 15/227,702

(22) Filed: Aug. 3, 2016

(65) Prior Publication Data

US 2016/0345389 A1 Nov. 24, 2016

Related U.S. Application Data

(62) Division of application No. 13/989,848, filed as application No. PCT/IB2011/003008 on Nov. 29, 2011, now Pat. No. 9,414,442.

(Continued)

(51) Int. Cl.
*H05B 6/68* (2006.01)
*H05B 6/64* (2006.01)
(Continued)

(52) U.S. Cl.
CPC ....... *H05B 6/6441* (2013.01); *B65D 81/3446* (2013.01); *G05B 15/02* (2013.01);
(Continued)

(58) Field of Classification Search
CPC ............ B65D 81/3446; B65D 2203/06; B65D 2203/10; H05B 6/6438; H05B 6/705;
(Continued)

(56) References Cited

U.S. PATENT DOCUMENTS 4,418,262 A 11/1983 Noda
4,508,948 A 4/1985 Carlson
(Continued)

FOREIGN PATENT DOCUMENTS

EP 0 615 763 9/1994
JP 2001-317741 11/2001
(Continued)

OTHER PUBLICATIONS

PCT International Search Report and Written Opinion, dated Jun. 20, 2012, in Application No. PCT/IB2011/003008, 17 pages.

(Continued)

*Primary Examiner* — Quang T Van
(74) *Attorney, Agent, or Firm* — Finnegan, Henderson, Farabow, Garrett & Dunner, LLP

(57) ABSTRACT

Systems, apparatuses, and methods are disclosed for cooking a food item using RF oven. The food item may include a tag containing information regarding food items associated with the food item. The RF oven may include an interface to receive the information. The RF oven may also include a processor to determine an amount of energy to be delivered to the food item based on the information. The processor may be configured to cause a RF power source to supply RF energy to cook the food item based on the determined amount of energy.

13 Claims, 9 Drawing Sheets

Related U.S. Application Data

(60) Provisional application No. 61/417,683, filed on Nov. 29, 2010.

(51) Int. Cl.
  *H05B 6/02* (2006.01)
  *B65D 81/34* (2006.01)
  *G05B 15/02* (2006.01)

(52) U.S. Cl.
  CPC ............. *H05B 6/02* (2013.01); *H05B 6/6438* (2013.01); *H05B 6/687* (2013.01); *B65D 2203/06* (2013.01); *B65D 2203/10* (2013.01)

(58) Field of Classification Search
  CPC ........ H05B 6/02; H05B 6/687; H05B 6/6441; G05B 15/02
  USPC ....... 219/635, 620, 621, 622, 624, 626, 627, 219/634, 494, 506, 714, 647, 649, 663, 219/665; 426/108, 231, 392, 35; 99/451, 99/331, 285, 326; 340/825.37, 572.1, 340/825.36, 825.54
  See application file for complete search history.

(56) References Cited

U.S. PATENT DOCUMENTS

| | | | |
|---|---|---|---|
| 4,517,429 A | 5/1985 | Horinouchi | |
| 4,568,810 A | 2/1986 | Carmean | |
| 4,582,713 A | 4/1986 | Hirokawa et al. | |
| 5,074,200 A | 12/1991 | Ruozi | |
| 5,293,019 A | 3/1994 | Lee | |
| 5,321,232 A | 6/1994 | Ogle | |
| 5,426,280 A | 6/1995 | Smith | |
| 6,252,206 B1 | 6/2001 | Leukhardt et al. | |
| 7,723,655 B2 | 5/2010 | Kim | |
| 9,277,601 B2 * | 3/2016 | Bandholz | H05B 6/6441 |
| 2002/0026325 A1 | 2/2002 | Hirahara et al. | |
| 2004/0149736 A1 | 8/2004 | Clothier | |
| 2009/0321429 A1 * | 12/2009 | Hyde | H05B 6/6447 219/710 |
| 2013/0080098 A1 * | 3/2013 | Hadad | G01N 27/00 702/66 |

FOREIGN PATENT DOCUMENTS

WO  WO 2005/006239  1/2005
WO  WO 2008/088124  7/2008

OTHER PUBLICATIONS

Swain, Mark et al., "What is the most energy efficient method of cooking a 'British' roast dinner?" University of Bristol, frperc-Research Projects, Feb. 29, 2008, internet source.

* cited by examiner

SYSTEM, APPARATUS, AND METHOD FOR COOKING USING RF OVEN

CROSS-REFERENCE TO RELATED APPLICATIONS

This application is a division of U.S. application Ser. No. 13/989,848, filed on May 28, 2013, which is a national phase of International Application No. PCT/IB2011/003008, filed on Nov. 29, 2011, which claims priority to U.S. Provisional Application No. 61/417,683, filed on Nov. 29, 2010. The disclosure of each of the above applications is incorporated herein by reference in its entirety.

TECHNICAL FIELD

The present invention relates to systems, apparatuses, and methods for food cooking using radio frequency (RF) oven.

BACKGROUND

Cooking food using a conventional oven or stove, a cook usually controls at least one of two parameters during the cooking process: the cooking time and cooking temperature (or degree of heat in the stove). Usually, cooking is performed by heat convection and/or conduction from the outside towards the interior part of the food. On the other hand, when cooking food using electromagnetic (EM) energy, such as EM energy in the radio frequency (RF) range, EM energy may be absorbed by the food and transferred into thermal energy, which in turn may cause the temperature of the food to rise.

SUMMARY

Some disclosed embodiments may include a packaged food item. The packaged food item may include packaging, a food item to be cooked associated with the packaging, and a machine readable element associated with the packaging. The machine readable element may include information for use by a processor in determining instructions for electromagnetically cooking the food item. The information may include one or more values configured to enable the processor to determine an amount of energy to be absorbed by the food item for cooking.

Other disclosed embodiments may include an apparatus, for example an RF oven, and a method for processing (e.g., heating, cooking) food. The apparatus and method may involve an interface and a processor. The processor may be configured to receive food-identifying information characterizing at least one food item to be heated. The processor may also be configured to determine, based on the food-identifying information, an amount of electromagnetic energy to be absorbed by the at least one food item in order to achieve a desired processing result. The processor may be further configured to cause application of the determined electromagnetic energy to the at least one food item.

Other disclosed embodiments may include an electromagnetic energy processing apparatus. The apparatus may involve an interface and a processor. The processor may be configured to receive characterizing information relating to an object to be processed. The processor may also be configured to cause electromagnetic energy to be applied to the object such that a first amount of energy is absorbed by the object. In addition, the processor may be configured to determine a time-temperature profile associated with the object resulting from the absorption of the first amount of energy to the object. Moreover, the processor may be configured to determine, based on the characterizing information, the first amount of energy absorbed by the object, and the time-temperature profile, a second amount of energy to be absorbed by the object to achieve a predetermined processing result. The processor may be also configured to cause electromagnetic energy to be applied to the object such that the second amount of energy is absorbed by the object.

Other disclosed embodiments may include a method for processing an object using electromagnetic energy. The method may comprise: receiving, via an interface, characterizing information relating to the object; acquiring, by a processor, a time-temperature profile for heating the object that includes a temperature increase segment and a constant temperature segment; delivering, from a source of electromagnetic energy, energy to the object and measure the temperature change of at least a portion of the object and the initial amount of energy absorbed by the object due to the delivery of energy; determining, by the processor, a first amount of electromagnetic energy to be absorbed by the object in order to provide the temperature increase segment based on the characterizing information, the measured temperature, and the initial amount of energy absorbed; causing absorption of the first amount of electromagnetic energy by the object to provide the temperature increase segment; determining, by the processor, a second amount of electromagnetic energy to be absorbed by the object in order to achieve the constant temperature segment based on the characterizing information and at least one of the first amount of energy and the initial amount of energy; and causing absorption of the second amount of electromagnetic energy by the object to provide the constant temperature segment.

Some disclosed embodiments may include an apparatus for electromagnetically processing at least two food components simultaneously. The apparatus may include an interface and a processor. The processor may be configured to receive information characterizing a first food component to be heated, e.g., heated, cooked etc. The processor may also be configured to receive information characterizing a second food component to be heated. The processor may also be configured to determine, based on the information characterizing the first food component to be heated, a first amount of energy to be absorbed by the first food component. The processor may further be configured to determine, based on the information characterizing the second food component to be heated, a second amount of energy to be absorbed by the second food component. Moreover, the processor may be configured to regulate energy delivery to the first and second food components, such that a total amount of energy absorbed by the food components is a function of the determined first and second amounts of energy.

Another disclosed embodiment may include a prepackaged food item. The prepackaged food item may include a container, first and second food items in the container, and a machine readable element associated with the container. The machine readable element may include information for use by a processor in determining instructions for cooking the food item. The information may include a first set of one or more values configured to enable the processor to determine an amount of energy to be absorbed by the first food item. The information may also include a second set of one or more values configured to enable the processor to determine an amount of energy to be absorbed by the second food item.

Some other disclosed embodiments may include an apparatus for electromagnetically cooking a food item. The apparatus may include an interface and a processor. The processor may be configured to receive characterizing information indicative of whether the food item is substantially homogeneous. When the characterizing information indicates that the food item is substantially homogeneous, the processor may also be configured to receive classification information associated with the food item and a weight value associated with the food item; determine an amount of energy to be absorbed by the food item based on the characterizing information, the classification information, and the mass value; and control at least one source of electromagnetic such that the determined amount of energy is absorbed by the food item.

Some other disclosed embodiments may include an apparatus for electromagnetically processing, e.g., cooking, a non-homogeneous food item. The apparatus may include an interface and a processor. The processor may be configured to receive classification information identifying a food type associated with each component in the food item and a weight value associated with each of the components. The processor may also be configured to determine an amount of energy to be absorbed by the food item based on the classifying information, and a plurality of weight values. The processor may be further configured to control at least one source of electromagnetic energy to deliver energy to the food item such that the determined amount of energy is absorbed by the food item.

Other disclosed embodiments may include a packaged food item. The packaged food item may include a packaging, a food item to be cooked at least partially disposed within the packaging, and a machine readable element associated with the packaging. The machine readable element may include information relating to at least one of storing conditions, salt contents, fat content, moisture content, aging conditions, initial temperature of the food item, or the like. The information may be configured for use by a processor in determining instructions for electromagnetically cooking the food item. The information may further include one or more values configured to determine an amount of energy to be absorbed by the food item during cooking.

Other disclosed embodiments may include an apparatus for processing an object using electromagnetic energy. The apparatus may include an interface and a processor. The processor may be configured to: receive, via the interface, characterizing information relating to the object; acquire a time-temperature profile for processing the object that includes a temperature increase segment and a constant temperature segment; deliver electromagnetic energy to the object and measure the temperature change of at least a portion of the object and an initial amount of energy absorbed by the object due to the delivery of energy; determine a first amount of electromagnetic energy to be absorbed by the object in order to provide the temperature increase segment based on the characterizing information, the measured temperature, and the initial amount of energy absorbed; cause absorption of the first amount of electromagnetic energy by the object to provide the temperature increase segment; determine a second amount of electromagnetic energy to be absorbed by the object in order to achieve the constant temperature segment based on the characterizing information and at least one of the first amount of energy or the initial amount of energy; and cause absorption of the second amount of electromagnetic energy by the object to provide the constant temperature segment.

The preceding summary is not intended to restrict in any way the scope of the claimed invention. In addition, it is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate various embodiments and exemplary aspects of the present invention and, together with the description, explain principles of the invention. In the drawings.

DESCRIPTION OF EXEMPLARY EMBODIMENTS

Reference will now be made in detail to exemplary embodiments of the invention, examples of which are illustrated in the accompanying drawings. When appropriate, the same reference numbers are used throughout the drawings to refer to the same or like parts.

Figure 1:
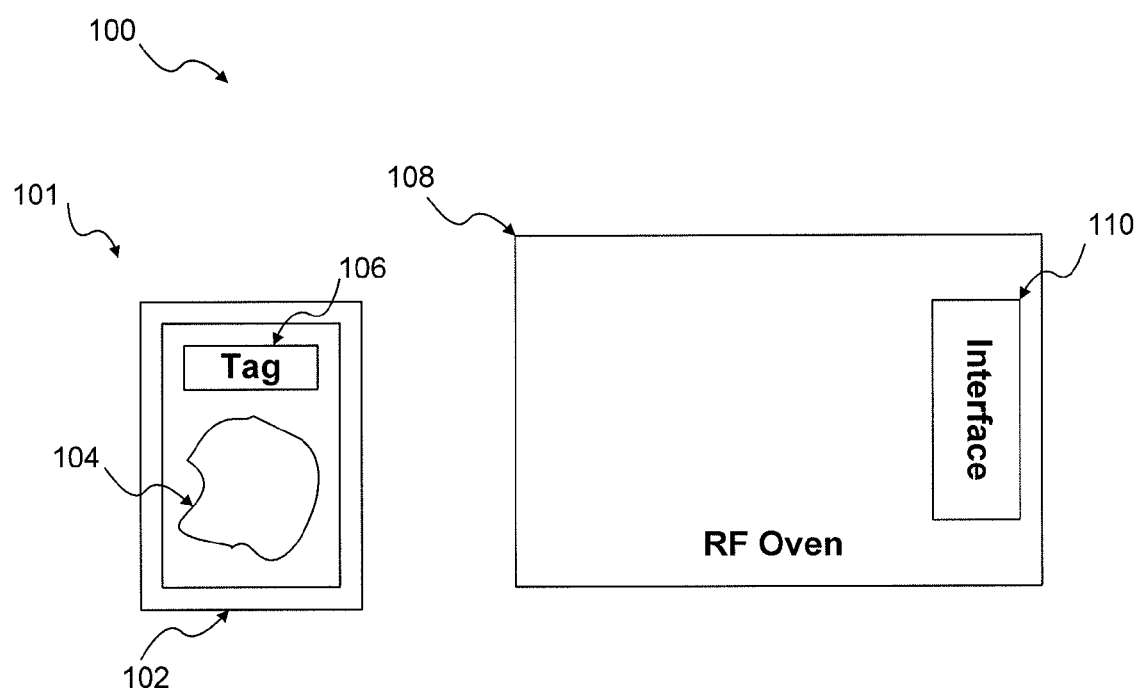
FIG. 1 is a diagrammatic representation of a system for cooking a food item using an RF oven, in accordance with some exemplary disclosed embodiments.

Embodiments of the invention may involve systems, apparatuses and methods for applying electromagnetic energy to process an object in an energy application zone. Electromagnetic energy processing apparatus may be any apparatus configured to apply electromagnetic energy, for example in the RF frequency range, to process an object placed in the energy application zone. An object is consider to be processed by electromagnetic energy (e.g., RF energy) if at least one property in at least a portion of the object has changed due to electromagnetic energy application. For example, electromagnetic energy processing apparatus may be a cooking oven that cooks food items by applying RF radiation to the food items; such process may also be called RF cooking process. A food item is considered cooked in an RF oven if at least a portion of the item (e.g., at least one food ingredient or food component) has been: thawed, cooked, baked, browned, warmed, roasted, etc., by applying electromagnetic energy (e.g., RF energy). As used herein, the term "system" may include any apparatuses, objects, or the combination thereof. For example, FIG. 1 illustrates an exemplary system 100 including a packaged food item 101 and an RF oven 108, in accordance with some embodiments of the invention. An RF oven may be an electromagnetic energy processing apparatus that applies electromagnetic energy in the RF frequency range to process (e.g., cook) an object placed in the RF oven. Packaged food item 101 may include a packaging 102. A food item 104 may be associated with packaging 102. Food item 104 may contain one or more food components and may comprise one or more ingredients. As used herein, the term "food component" refers generally to any part or entirety of a food item, including but not limited to: a part or entirety of a food item that is a mixture of several different kinds of food ingredients, e.g., a food component may be a meat ball made of meat, vegetables, and spices. The term "food ingredient" refers generally to one kind of food material, e.g., potato, beans, or meat. A food component may contain one or more food ingredients; while a food ingredient, when separated physically into two or more parts, may also be referred as different food components. However, when not in doubt, the terms "food component" and "food ingredient" may be used interchangeably. A machine readable element, e.g., a tag 106, may be associated with packaging 102. Tag 106 may contain information regarding food item 104. Such information may be obtained through an interface 110 of RF oven 108 to process (e.g., cook, thaw, heat, etc.) packaged food product 101 using RF oven 108. The machine readable element may be configured to be read using AIDC technology and referred to as an AIDC element. For example, an element reader may use any type of Auto ID Capture (AIDC) technology. Automatic Identification and Data Capture (AIDC) refers to the methods of automatically identifying objects, collecting data about them, and entering that data directly into computer systems. Technologies typically considered as part of AIDC include bar codes, Radio Frequency Identification (RFID), magnetic stripes, Optical Character Recognition (OCR), and smart cards. AIDC may also be referred to as "Automatic Identification," "Auto-ID," and "Automatic Data Capture." The element reader may include a printed code reader (e.g., a barcode reader, a matrix code reader, etc.), an RFID reader, or a combination of such technologies. In some embodiments, interface 110 may include one or more device to implement AIDC technology. For example, interface 110 may include the element reader discussed above.

Figure 2A:
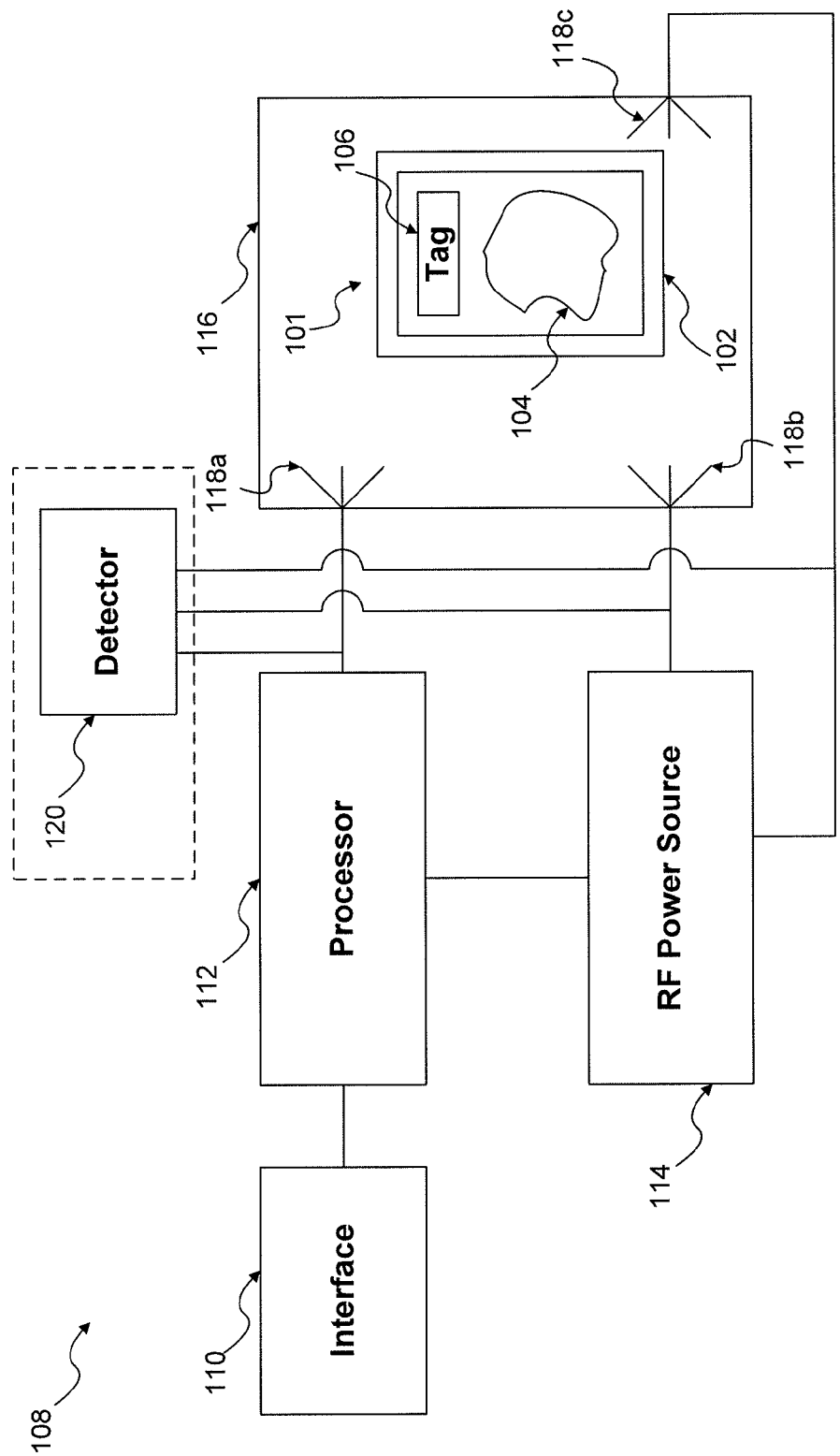
FIG. 2A is a diagrammatic representation of an RF oven for food cooking using electromagnetic energy, in accordance with some exemplary disclosed embodiments.

FIG. 2A illustrates an electromagnetic energy processing apparatus, such as RF oven 108, in accordance with some embodiments of the invention. In addition to interface 110 (as illustrated in FIG. 1), RF oven 108 may include a processor 112, an RF power source 114, radiating elements 118a, 118b, and 118c, a detector 120, and an energy application zone 116, which encloses or partially encloses packaged food product 101. As used herein, the term apparatus may include any component or group of components described herein. For example, an apparatus may refer only to a processor, such as processor 112, as illustrated in FIG. 2A. Alternatively, an apparatus may include a combination of a processor (e.g., 112) and one or more radiating elements (e.g., 118a, 118b, and/or 118c); a processor (e.g., 112), an energy application zone (e.g., 116), and one or more radiating elements (e.g., 118a, 118b, and/or 118c); a processor (e.g., 112) and a source of electromagnetic energy (e.g., 114); a processor (e.g., 112), an energy application zone (e.g., 116), one or more radiating elements (e.g., 118a, 118b, and/or 118c), and a source of electromagnetic energy (e.g., 114); or any other combination of components described herein.

The term electromagnetic energy, as used herein, includes any or all portions of the electromagnetic spectrum, including but not limited to, radio frequency (RF), infrared (IR), near infrared, visible light, ultraviolet, etc. In some cases, applied electromagnetic energy may include RF energy with a wavelength of 100 km to 1 mm, which corresponds to a frequency of 3 KHz to 300 GHz. In some cases, RF energy within a narrower frequency range, e.g., 1 MHz-100 GHz, 500 MHz-1 GHz, 800 MHz-1 GHz, may be applied. Microwave and ultra high frequency (UHF) energy, for example, are both within the RF range. Even though examples of the invention are described herein in connection with the application of RF energy, these descriptions are provided to illustrate a few exemplary principles of the invention, and are not intended to limit the invention to any particular portion of the electromagnetic spectrum.

In addition, reference to an object (or load, such as packaged food product 101 or food item 104) to which electromagnetic energy is applied is not limited to a particular form. An object may include a liquid, solid, or gas, depending upon the particular process with which one or more embodiments of the invention are utilized, and the object may include composites or mixtures of matter in one or more differing phases. Further, although the term object is in the singular, it may refer to multiple items or detached parts or components. Thus, by way of a non-limiting example, the term object may encompass such matter as food to be cooked; frozen material to be thawed; liquids to be thawed, heated, boiled, or vaporized; or any other material for which there is a desire to apply electromagnetic energy.

In accordance with some embodiments of the invention, a system, apparatus, or method may further involve the use of an energy application zone, such as energy application zone 116, as shown in FIG. 2A. An energy application zone may include any void, location, region, or area where electromagnetic energy may be applied. It may include a hollow, or may be filled or partially filled with liquids, solids, gases, or combinations thereof. By way of example only, an energy application zone may include the interior of an enclosure, interior of a partial enclosure, interior of a conduit, open space, solid, or partial solid, which allows for the existence, propagation, and/or resonance of electromagnetic waves. The zone may be permanent or may be temporarily constituted for purposes of energy application. For ease of discussion, all such alternative energy application zones may alternatively be referred to as cavities, with the understanding that the term cavity implies no particular physical structure other than an area in which electromagnetic energy may be applied.

Electromagnetic waves in the energy application zone may exhibit a certain field pattern. A "field pattern" may refer to an electromagnetic field configuration characterized by, for example, the amplitude of electric field intensity distribution in the energy application zone. In general, electromagnetic field intensity is time varying and spatially dependent. That is, not only may the field intensity differ at different spatial locations, but for a given location in space, the field intensity can vary in time or may oscillate, often in a sinusoidal fashion. Therefore, at different spatial locations, the field intensities may not reach their maximum values (i.e., their amplitude values) at the same time.

A field pattern may be excited by applying electromagnetic energy to the energy application zone. As used herein, the term "excited" is interchangeable with "generated," "created," and "applied." In general, a field pattern in an energy application zone may be uneven (i.e., non-uniform). That is, the field pattern may include areas with relatively high amplitudes of field intensity (also referred to as "hot spots") and other areas with relatively low amplitudes of field intensity (also referred to as "cold spots"). Electromagnetic waves propagating in an energy application zone may be excited using a certain electromagnetic mode that may result in a particular electromagnetic field pattern. The electromagnetic field pattern excited in an energy application zone using propagating (e.g., traveling) waves (e.g., at a single frequency) may exhibit varying high amplitude areas of field intensity in both time and spatial location in the zone. Electromagnetic waves (e.g., at a single frequency) resonating in the energy application zone may be excited such that the high amplitudes of field intensity may be substantially fixed or stable. A field pattern excited by either propagating or resonating wave(s) may be changed when an object is placed in the energy application zone. The rate of energy transfer to an object in the energy application zone may depend upon the amplitude of field intensity. For example, energy delivery may occur faster at areas with higher amplitude of field intensity than in areas with lower amplitude of field intensity. In fact, energy delivery may occur in all non-zero intensities that coincide with the object, and the extent of heating may depend, among other things, on the intensity of the field to which the object is exposed and the duration of exposure. As used herein, the term "energy transfer" is interchangeable with "energy delivery." In some embodiments, a system, apparatus, or method may involve the use of a source configured to supply electromagnetic energy to the energy application zone. A source may include any component or components suitable for generating and supplying electromagnetic energy. For example, electromagnetic energy may be supplied to the energy application zone in the form of electromagnetic waves (also known as electromagnetic radiation) at predetermined wavelengths or frequencies. Electromagnetic waves may include propagating waves, resonating waves, evanescent waves, and/or waves that travel through a medium in any other manner. Electromagnetic radiation carries energy that may be imparted to (or dissipated into) matter with which it interacts.

Referring to FIG. 2A, the source may include an RF power source 114, which includes one or more components configured to generate RF energy. For example, RF power source 114 may include a magnetron configured to generate microwaves at predetermined wavelengths or frequencies. Alternatively, referring to FIG. 2B, RF power source 114 may include an oscillator 130, such as a voltage controlled oscillator, configured to generate AC waveforms (e.g., AC voltage or current) with a constant or varying frequency. AC waveforms may include sinusoidal waves, square waves, pulsed waves, triangular waves, or other types of waveforms with alternating polarities. With oscillator 130, the frequency of the AC waveforms may be controlled by adjusting, for example, the voltage supplied to the oscillator. By varying the voltage supplied to the oscillator in a controllable manner, frequency modulation may be achieved. Alternatively, a source of electromagnetic energy may include any other power supply, such as an electromagnetic field generator, electromagnetic flux generator, or any mechanism for generating electromagnetic energy.

Figure 2B:
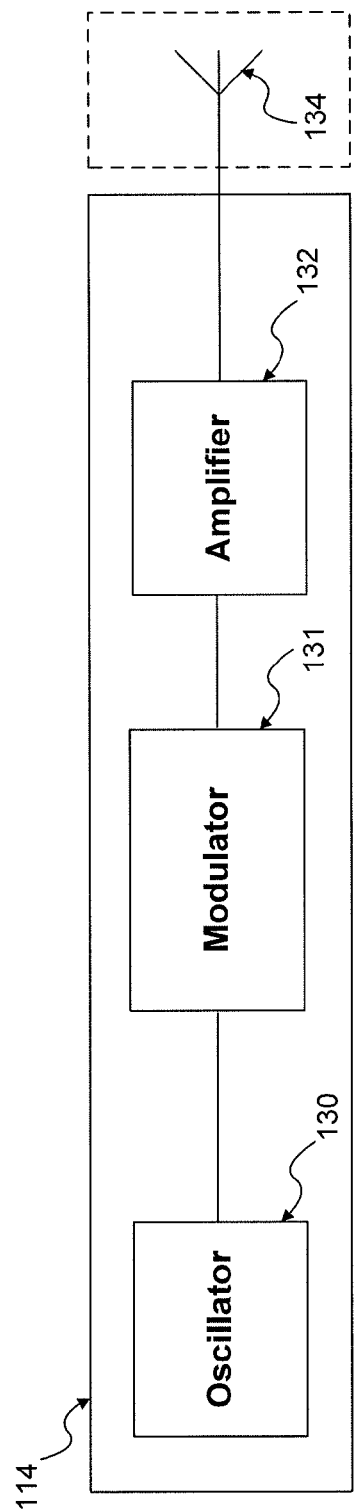
FIG. 2B is a diagrammatic representation of apparatuses for providing RF power, in accordance with several exemplary disclosed embodiments.

Referring to FIG. 2B, RF power source 114 may also include an amplifier 132 for amplifying, for example, a waveforms generated by oscillator 130. Amplifier 132 may include, for example, a power amplifier including one or more power transistors. Amplifier 132 may include a step-up transformer having more turns in the secondary winding than in the primary winding. In other embodiments, amplifier 132 may include one or more power electronic devices such as bipolar transistors, MOSFETs, thyristors, insulated-gate bipolar transistors (IGBTs), integrated gate-commutated thyristors (IGCTs), and any other power electronic devices suitable for amplifying RF signals. The amplifier may include one or more signal converters, such as AC-to-AC converters, AC-to-DC-to-AC converters, or any other suitable type of converters. Alternatively, amplifier 132 may include any other device(s) or circuit(s) configured to scale up an input signal to a desired level.

As illustrated in FIG. 2B, RF power source 114 may also include at least one radiating element 134 configured to deliver electromagnetic energy to zone 116. As used herein, the term "radiating element" is interchangeable with "antenna." Radiating element 134 may include one or more waveguides and/or one or more antennas (also known as power feeds) for supplying electromagnetic energy to energy application zone 116. For example, radiating element 134 may include slot antennas, dipole antennas, wire antenna, horn antenna, patch antennas, and other types of antennas. Alternatively, radiating element 134 may also include waveguides or antennas of any other kind or form, or any other suitable structure from which electromagnetic energy may be emitted.

Alternatively, radiating element 134 may be separate from RF power source 114, as indicated by the dashed lines in FIG. 2B. In this case, the radiating element may be coupled to the RF power source 114, as shown in FIG. 2A, items 118a, 118b, or 118c. In any events, radiating elements may be used to deliver RF energy from the source to the cavity.

In some embodiments, RF oven 108 or RF power source (as illustrated in FIG. 2B) may include a modulator 131 for modulating parameters of the electromagnetic waveforms, e.g., the frequency of individual electromagnetic waves, and/or the relative phases of two or more electromagnetic waves. In some embodiments, modulator 131 may include at least one of a phase modulator, a frequency modulator, and an amplitude modulator configured to modify the phase, frequency, and amplitude of an AC waveform, respectively. For example, modulator 131 may include a phase modulator, which may be controlled to perform a predetermined sequence of time delays on an AC waveform. For example, the phase of one AC waveform can be increased by a number of degrees (e.g., 10 degrees) relative to the phase of another AC waveform or waveforms for each of a series of time periods. In some embodiments, processor 112 may dynamically and/or adaptively regulate modulation based on feedback from energy application zone 116.

In some embodiments, more than one radiating element may be provided. The radiating elements may be located adjacent to, on, or in one or more surfaces of the energy application zone. For example, in FIG. 2A, antennas 118b and 118c may be located on opposite surfaces of energy application zone 116. Alternatively, radiating elements may be located inside or outside the energy application zone. When radiating element(s) are located outside the zone, they may be coupled to elements that enable radiated energy to reach the energy application zone. Additionally or alternatively, when radiating element(s) are located outside the zone, the zone may be made of RF transparent material. The orientation and configuration of each radiating element may be distinct or the same, based on the requirements of a particular application. One or more radiating element(s) may be located inside the zone, and may be located adjacent to, or in contact with the object. In some embodiments, the radiating element(s) may be embedded in the object or immersed in the object (e.g., when the object is in a liquid state, for example a soup). Furthermore, the location, orientation, and configuration of each radiating element may be predetermined before applying energy to the energy application zone. In certain embodiments, these parameters may be dynamically adjusted, e.g., using a processor, while applying energy.

In addition to delivering electromagnetic energy, radiating element(s), such as antenna 118a in FIG. 2A, may also be configured to receive electromagnetic energy. In other words, as used herein, the term radiating element may broadly refer to any structure from which electromagnetic energy may radiate and/or be received, regardless of whether the structure was originally designed for purposes of radiating or receiving energy, and regardless of whether the structure serves any additional function.

A system, apparatus, or method of some embodiments may involve the use of a processor, such as processor 112 in FIG. 2A. As used herein, the term "processor" may include an electric circuit that executes one or more instructions. For example, such a processor may include one or more integrated circuits, microchips, microcontrollers, microprocessors, all or part of a central processing unit (CPU), graphics processing unit (GPU), digital signal processors (DSP), field-programmable gate array (FPGA) or other circuit suitable for executing instructions or performing logic operations. As used herein, the term "processor" is interchangeable with "controller."

The instructions executed by the processor may, for example, be pre-loaded into the processor or may be stored in a separate memory unit such as a RAM, a ROM, a hard disk, an optical disk, a magnetic medium, a flash memory, other permanent, fixed, or volatile memory, or any other mechanism capable of providing instructions to the processor. The processor(s) may be customized for a particular use, or can be configured for general-purpose use and perform different functions by executing different software.

If more than one processor is employed, all may be of similar construction, or they may be of differing constructions electrically connected or independent from one another. They may be separate circuits or integrated in a single circuit. When more than one processor is used, they may be configured to operate independently or collaboratively. They may be coupled electrically, magnetically, optically, acoustically, mechanically, wirelessly or in any other way permitting at least one signal to be communicated between them.

In some embodiments, processor 112 may control RF power source 114 to cause, for example, a desired field pattern in energy application zone 116. For example, the processor may determine and/or select one or more modulation space elements to generate a desired field pattern in energy application zone 116.

The term "modulation space" or "MS" is used to collectively refer to all the parameters that may affect a field pattern in the energy application zone and all combinations thereof. In some embodiments, the "MS" may include all possible components that may be used and their potential settings (either absolute or relative to others) and adjustable parameters associated with the components. For example, the "MS" may include a plurality of variable parameters, the number of antennas, their positioning (including location, polarization, and/or orientation, if modifiable), the useable bandwidth, a set of all useable frequencies and any combinations thereof, power settings, time settings, phases, etc. The MS may have any number of possible variable parameters, ranging between one parameter only (e.g., a one dimensional MS limited to frequency only or phase only—or other single parameter), two or more dimensions (e.g., varying frequency and amplitude together within the same MS), or many more.

Each variable parameter associated with the MS is referred to an MS dimension. By way of example, a three dimensional modulation space, with three dimensions designated as frequency (f), phase ((p), and amplitude (A). That is, frequency, phase, and amplitude of the electromagnetic waves are modulated during energy delivery, while all the other parameters may be predetermined and fixed during energy delivery.

The term "modulation space element" or "MSE" may refer to a specific set of values of the variable parameters in MS. Therefore, the MS may also be considered to be a collection of all possible MSEs. For example, two MSEs may differ one from another in the relative amplitudes of the energy being supplied to a plurality of radiating elements. An MSE may have a specific frequency f(i), a specific phase φ(i), and a specific amplitude A(i). If even one of these MSE variables change, then the new set defines another MSE. For example, (3 GHz, 30°, 12 V) and (3 GHz, 60°, 12 V) are two different MSEs, although only the phase component changes.

Differing combinations of these MS parameters will lead to differing field patterns excited in the energy application zone and differing energy distribution patterns in the object. A plurality of MSEs that can be executed sequentially or simultaneously to excite a particular field pattern in the energy application zone may be collectively referred to as an "energy delivery scheme." For example, an energy delivery scheme may consist of three MSEs (f(1), φ(1), A(1)), (f(2), φ(2), A(2)), and (f(3), φ(3), A(3)). Because there are a virtually infinite number of MSEs, there are a virtually infinite number of different energy delivery schemes, resulting in virtually infinite number of differing field patterns in any given energy application zone (although different MSEs may at times cause highly similar or even identical field patterns). Of course, the number of differing energy deliver schemes may be, in part, a function of the number of MSEs that are available.

A system, apparatus, or method in accordance with some embodiments of the invention may involve the use of one or more detectors configured to detect EM feedbacks associated with electromagnetic waves transmitted and/or received by the one or more radiating elements. For example, as shown in FIG. 2A, detector 120 may be coupled to radiating elements 118a-118c to detect one or more characteristics of the electromagnetic waves being transmitted and/or received. EM energy as used herein may include all detectable parameters of the electromagnetic energy, for example: power, frequency, energy, current, voltage, phases between emissions, etc. EM feedbacks may include any received signal or any value calculated based on one or more received signals, which may be indicative of the dielectric response of the cavity and the object to the applied RF energy. EM feedback may be MSE-dependent, for example, may include signals, the values of which vary over different MSEs. Electromagnetic feedback may include, for example, input and output power levels, scattering parameters (a/k/a S parameters) and values derivable from the S parameters and/or from the power levels, for example, input impedance, dissipation ratio, time or MSE derivative of any of them, or any other value that may be derivable from the received signals.

Detector 120 may include one or more electric circuits configured to measure, sense, monitor, etc. at least one parameter associated with an electromagnetic wave. For example, such a detector may include a power meter configured to detect a level of power associated with an incident, reflected and/or transmitted electromagnetic wave (also known as "incident power," "reflected power," and "coupled power"). As used herein, incident power refers to the power provided to the radiating element(s); reflected power refers to the power received by a radiating element when acting as a receiver; and the coupled power refers to the power that couples from one radiating element to another (e.g., through direct interaction). Such a detector may also include an amplitude detector configured to detect amplitude of the wave, a phase detector configured to detect a phase of the wave, a frequency detector configured to detect a frequency of the wave, and/or any other circuit suitable for detecting a characteristic of an electromagnetic wave.

Energy that may be dissipated in or absorbed by an object is referred to herein as "absorbable energy" or "absorbed energy" or "energy absorption" or "energy dissipation" or "dissipated energy." Absorbable energy may be an indicator of the object's capacity to absorb energy (e.g., RF energy) or the ability of the apparatus to cause energy to dissipate in a given object (for example—an indication of the upper limit thereof). In some of the presently disclosed embodiments, absorbable energy may be calculated as a product of the incident energy (e.g., maximum incident energy) supplied to the at least one radiating element (e.g., antenna) and a dissipation ratio. Reflected energy (e.g., the energy not absorbed or coupled) may, for example, be a value indicative of energy absorbed by the object. By way of another example, processor 112 may calculate or estimate absorbable energy based on the portion of the incident energy that is reflected and the portion that is coupled. The estimation or calculation may serve as a value indicative of absorbed and/or absorbable energy.

Absorbable energy may also include energy that may be dissipated in the structures of the energy application zone in which the object is located (e.g., cavity walls) or leakage of energy at an interface between an oven cavity and an oven door. The amount of electromagnetic energy absorbed in the cavity walls may be substantially small, and thus, the amount of electromagnetic energy absorbed in the object may be substantially equal to the amount of absorbable energy.

In some of the presently disclosed embodiments, a dissipation ratio may be calculated using formula (1):

$$DR=(Pin-Prf-Pcp)/Pin \quad (1)$$

where Pin represents the electromagnetic energy (or energy rate=power) supplied into zone 116 by antennas 118a, 118b, and/or 118c. Prf represents the electromagnetic energy (or energy rate=power) reflected/returned at those antennas that function as transmitters, and Pcp represents the electromagnetic energy (or energy rate=power) coupled at those antennas that function as receivers. DR may be a value between 0 and 1, and thus may be represented by a percentage number.

For example, consistent with an embodiment which is designed for three antennas 118a, 118b and 118c, processor 112 may be configured to determine input reflection coefficients $S_{11}$, $S_{22}$, and $S_{33}$ and the transfer coefficients may be $S_{12}=S_{21}$, $S_{13}=S_{31}$, $S_{23}=S_{32}$ detected by detector 120 based on a measured power and/or energy information during a sweep. As used herein, a sweep may include, for example, energy transmission over time at more than one MSE. For example, a sweep may include sequential transmission of energy at multiple MSEs in one or more contiguous MSE band; sequential transmission of energy at multiple MSEs in more than one non-contiguous MSE band; sequential transmission of energy at individual non-contiguous MSEs; and/or transmission of synthesized pulses having a desired MSE/power spectral content (e.g., a synthesized pulse in time). The MSE bands may be contiguous or non-contiguous. Thus, during an MSE sweeping process, the controller may regulate the energy supplied from a source (e.g., source 114) to at least one radiating elements to sequentially apply electromagnetic energy at various MSEs to zone 116, and to receive EM feedbacks from zone 116 associated with each MSE. The EM feedbacks and/or any values calculated based on the feedbacks may serve as indicators of absorbable energy by food item 104 at each MSE.

Accordingly, the dissipation ratio DR corresponding to one antenna (e.g., antenna 118a) may be determined based on the above mentioned reflection and transmission coefficients, according to formula (2):

$$DR=1-(|S_{11}|^2+|S_{12}|^2+|S_{13}|^2). \quad (2)$$

The value indicative of the absorbable energy may further involve the maximum incident energy (or energy rate=power) associated with a power amplifier (not illustrated) at the given MSE. As referred herein, a "maximum incident energy" may be defined as the maximal power that may be provided to the antenna at a given MSE throughout a given period of time. Thus, one alternative value indicative of absorbable energy may be the product of the maximum incident energy and the dissipation ratio. These are just two examples of values that may be indicative of absorbable energy. Alternative indicators of absorbable energy may be used, depending for example on the structure employed and the application. In some embodiments, one or more sensors configured to measure at least one characteristic of the electromagnetic field pattern excited in an energy application zone may be located in the zone. The one or more sensors may measure for example, the amplitude(s) of field intensity at the location(s) of the sensor(s). The amplitude of field intensity may be indicative of the absorbable energy.

In certain embodiments, the at least one processor may be configured to cause energy to be supplied to the at least one radiating element in at least a subset of the plurality of MSEs, wherein energy delivered to the zone at each of the subset of MSEs is inversely related to the absorbable energy value at the corresponding MSE. Such an inverse relationship may involve a general trend, e.g., when an indicator of absorbable energy in a particular MSE subset (i.e., one or more MSEs) tends to be relatively high, the actual incident energy at that MSE subset may be relatively low. When an indicator of absorbable energy in a particular MSE subset tends to be relatively low, the incident energy may be relatively high. This substantially inverse relationship may be even more closely correlated. For example, the transmitted energy may be set such that its product with the absorbable energy value (e.g., the absorbable energy by food product 101) is substantially constant across the MSEs applied.

Alternatively or additionally, processor 112 may be configured to vary the period of time during which energy is applied to each MSE as a function of the absorbable energy value. At times, both the duration and power at which each MSE is applied are varied as a function of the absorbable energy value. Varying the power and/or duration of energy supplied at each MSE may be used to cause substantially uniform energy absorption in the object or to have a controlled spatial pattern of energy absorption, for example, based on feedback from the dissipation properties of the object at each transmitted MSE.

Because absorbable energy can change based on a host of factors including object temperature, in some embodiments, it may be beneficial to regularly update absorbable energy values and adjust energy application based on the updated absorption values. These updates can occur multiple times a second, or can occur every few seconds or longer, depending on the requirements of a particular application.

In accordance with an aspect of some embodiments of the invention, the at least one processor 112 may be configured to determine a desired and/or target energy absorption level at each of a plurality of MSEs and adjust energy transmitted from the antenna at each MSE in order to obtain the target energy absorption level at each MSE. For example, processor 112 may be configured to target a desired energy absorption level at each MSE in order to achieve or approximate substantially uniform energy absorption in packaged food item 101 across a range of MSEs.

Alternatively, processor 112 may be configured to provide a target energy absorption level at each of a plurality of object portions, which collectively may be referred to as an energy absorption profile across the object. An absorption profile may include uniform energy absorption in the object, non-uniform energy absorption in the object, differing energy absorption values in differing portions of the object, substantially uniform absorption in one or more portions of the object, or any other desirable pattern of energy absorption in an object or portion(s) of an object.

In some embodiments, the at least one processor may be configured to adjust energy transmitted from the antenna at each MSE in order to obtain a desired target energy effect and/or energy effect in the object, for example: a different amount of energy may be provided to different parts and/or regions of the object.

In some embodiments, detector 120 may include a directional or a bi-directional coupler, configured to allow signals to flow from an amplifier to a radiating element when the radiating element functions as a transmitter, and to allow signals to flow from the radiating element to the detector when the radiating element functions as a receiver. Additionally, the detector may be further configured to measure the power of a flowing signal. In some embodiments, the detector may also include other types of circuits that measure the voltage and current of a flowing signal.

As illustrated in FIG. 2A, detector 120, shown within a dashed line box, may be a separate device that couples to processor 112 and/or RF power source 114. Alternatively, detector 120 may be integrated into RF power source 114 and/or processor 112.

In RF cooking (e.g., cooking by applying RF energy), the amount of energy required to cook food may be an important parameter in determining how the RF cooking process should proceed. As used herein, the term "amount of energy" may broadly refer to the absolute energy amount (e.g., in J or kJ); the amount of energy per unit weight/mass (e.g., in kJ/kg); the amount of energy per unit volume (e.g., in kJ/liter), or any other appropriate measure of energy.

In RF cooking, a variety of food types may be divided into groups based on the amount of energy required to cook them. This classification may differ from similar classifications used in conventional cooking. For example, in conventional cookbooks, cakes and pies are usually classified together under the term "cakes" and quiches have a different section. When using RF ovens, pies and quiches, both made from puff or short pastry, may be classified under the same group, and sponge-like cakes may belong to a different group. Table 1 presents an exemplary classification of various food types, related cooking protocols, and cooking energies (per mass/weight) for use in RF ovens, based on the RF energy absorption. The data listed in Table 1 were obtained from cooking experiments conducted in exemplary RF ovens.

TABLE 1

| Group No. | Classification | Cooking Protocol | Energy [kJ/kg] |
|---|---|---|---|
| 1 | Beef, veal, ostrich tenderloin, and lamb | Slow cooking | 1500 |
| | | Well done | 750 |
| | | Medium well | 650 |
| | | Medium | 550 |
| | | Medium rare | 450 |
| 2 | Game (e.g., rabbit, venison, slow cooking ostrich parts, wild boar, etc.) | Slow cooking | 1500 |
| 3 | Pork | | 6500 |
| 4 | Chicken, duck, turkey cut into pieces | | 500-700 |
| 5 | Fish | Cut into pieces | 350 |
| | | Whole fish | 400 |
| 6 | Seafood | | 200 |
| 7 | Beet | | 1200 |
| 8 | Potatoes, sweet potatoes and the like (turnip, carrot, garlic, etc.) | | 700 |
| 9 | Vegetables group I: cabbage, cauliflower, broccoli, and mushrooms | Al dente | 1000 |
| | | Medium | 1250 |
| | | Very soft | 1500 |
| 10 | Vegetables group II: Eggplants, zucchini and the like | | 500 |
| 11 | Yeast based dough and pastry | | 360 |
| 12 | Puff pastry and short pastry, including all types of pie/quiche crust and cookies | | 500 |
| 13 | Sponge cakes including: chocolate cakes, orange cakes, "ready to bake" cakes, etc. | | 350 |
| 15 | Fruits group I: apples, pears, apricots, etc. for pie/strudel filling/stuffing | | 500 |
| 16 | Fruits group II: berries, cherries, bananas, figs, etc. for pie/strudel filling/stuffing | | 300 |

It is noted that the energy amounts listed in Table 1 reflect the amount of energy needed in a prototype RF oven to achieve similar results to commonly used cooking temperatures and times according to conventional recipes. The energy amounts related to groups 1-6 are the amounts required to cook the food items to a desired processing result, e.g., from refrigerating temperature to the desired doneness. The term "amount required to cook" represents the amount of energy needed to be absorbed by the food item in order to achieve a desired processing result. The term "desired processing result" refers to a desired final state of an object (e.g., a food item) after processing in an electromagnetic processing apparatus (e.g., a desired temperature, softness, doneness, etc.). Energy amounts related to groups 7-16 are the amounts required to cook the food items from room temperature. The amount of energy needed to be absorbed by the food item may be calculated by a processor, for example by multiplication of the incident energy and the dissipation ratio measured during cooking process in an RF oven. Various parameters may affect the values shown in Table 1, including, for example, the initial temperature of the food (e.g., differences in room temperatures or the setting of different refrigerators), the ripeness of fruits or vegetables, the aging condition of meat, the degree of rising of yeast dough, etc. The measured (or estimated) values may also be influenced by a fixed or changing loss of energy due to factors other than the food. For example, the loss of energy may be related to oven properties, load properties, or anything included in the oven other than the food, for example, a dish, or any combination thereof. Nevertheless, experiments have shown that results shown in Table 1 are repeatable using the same prototype oven with only minor variations related to, for example, the dishes used during the cooking experiments. Such dishes include glass, ceramic, polymer-based, or even metallic materials (some exceptions include certain types of ceramic dishes that absorbed water and Pyrex dishes that contain thin metallic rods). In addition, since cooking in an RF oven may cause less drying of the food, over cooking may be substantially unnoticeable in many foods cooked by RF energy; or if noticeable, such over cooking may result in minimal damage to food quality. Of course, the energy amount may vary for different cooks or for different ovens, in a similar way to cooking time and cooking temperature considered when using a conventional oven.

The degree of aging or aging time may affect the optimal cooking conditions needed to cook certain meat, e.g., beef to a desired degree of doneness. The longer the aging time, for example, the lower the final cooking temperature and the shorter the time needed for the meat to reach a target degree of doneness. An additional factor that may affect selected cooking conditions may include the method used to age the meat. Two aging methods are commonly used: dry aging—in which the meat is hung to dry for several weeks; and wet-aging—in which the meat is aged in a vacuum sealed bag to retain its moisture. In the dry aging method, the meat has less moisture content thus requiring lower final temperature to be cooked to the same degree. Every type of meat has a recommended minimum and maximum aging time, defining a recommended aging time interval for each aging method. Meat aged for shorter than the minimum recommended time may become chewy upon cooking. On the other hand, meat aged longer than the maximum recommended time may become rotten and should not be cooked. In order to gain the same degree of doneness in two meat pieces from the same type having different aging periods and/or different aging methods, the meat having the shorter aging period may need to be cooked to a different temperature (e.g., a higher temperature) to obtain the same degree of doneness.

Other factors associated with the food to be cooked may affect selection of an appropriate set of cooking conditions (e.g., cooking energy). Such selections may result in deviations in the actual amount of energy needed to cook the food as compared to an average, expected amount of energy to cook a certain type of food. For example, food storage conditions may affect the moisture content of stored food. Higher humidity environments may result in a higher content of moisture in dry grains or legumes, and such a variation in moisture content may affect cooking parameters. Parameters such as salt content, fat content, initial temperature, aging time, degree of aging, etc. may also affect selection of appropriate cooking parameters in order to achieve a target cooking result in the food.

As an example of how aging time can affect cooking conditions required to reach a desired level of doneness, two slices of beef sirloin A and B weighing about 500 gr. aged in vacuum for 5 weeks and 3 weeks, respectively, were cooked separately. Each of the slices was at about 6° C. before cooking in an RF oven. For sirloin slice A (5 weeks aging), absorption of 175 kJ was required for cooking the beef to 55° C., at which the meat reached a medium degree of doneness. For sirloin B (3 aging weeks), absorption of 195 kJ was required for cooking the beef to 56° C., at which the meat reached a medium-rare degree of doneness. To further cook sirloin slice B to a medium level of doneness, 205 kJ total was needed, which was achieved at a final temperature of 59° C.

In another cooking experiment, 8 slices of beef sirloin weighing about 500 gr. were aged in vacuum for 4 different aging periods: 5 weeks, 4 weeks, 3 weeks and 2 weeks (two slices for every aging period). The slices were cooked separately in an RF oven, until an amount of energy of 175 kJ was absorbed. The final average temperatures of the slices, taken near the center of each slice, and the degree of doneness are listed below:

5 weeks—55° C.—medium
4 weeks—50° C.—medium rare
3 weeks—47° C.—rare
2 weeks—43.5° C.—rare In some embodiments of the invention, a prepackaged food item has a machine readable element associated with it or its packaging. The machine readable element may have information relating to storage conditions (e.g., aging conditions of meat), salt content, fat content, moisture content, initial temperature, or the like, that may affect an amount of energy needed to reach a target final cooking state. The machine readable element may also include additional information relevant to cooking, including, e.g., food category, food type (e.g., beef entrecote, etc.), mass/weight, the desired degree of doneness, or the desired final temperature, or any other suitable parameter related to cooking. Such information may be read from the machine readable element, indicated by the user, received from a remote location on the Internet, or a combination thereof.

In some embodiments of the invention, a prepackaged meat item (e.g., beef tenderloin, entrecote, sirloin, game, lamb or others) may include a machine readable element associated with it or its packaging. The machine readable element may include various types of information, including, e.g., an amount of energy needed for cooking, the degree of aging, date of butchering, packaging date, aging method, humidity level, non aging storage conditions, aging time, fat content, cut type, cut mass/weight, etc. Additional information may include: food category, food type (e.g., beef entrecote), mass/weight, the desired degree of doneness, or the desired final temperature or the like. Such information may be read from the machine readable element, indicated by the user, or a combination thereof. In some embodiments, the machine readable element may include one or more codes and/or ID numbers and the processor may be configured to receive various types of information from, for example, a lookup table stored in a memory associated with the processor or from a remote location on the Internet (e.g., a website). The code and/or ID number may be read automatically from the machine readable element. Additionally or alternatively, the code and/or ID number may be input manually by a user via a user interface.

If the aging time exceeds a recommended or permitted period or is less than recommended, the oven may prompt the user that the cooking conditions are not appropriate. Optionally, the oven may suggest various options to the user in these situations. For example, the oven may prompt the user to further age the meat, increase cooking time, or take another suitable action. In case of over aged meat, the oven may indicate to the user or otherwise prompt the user to dispose of the meat. A user override may be available.

In some embodiments of the invention, the meat may be cooked in a package or taken out from the package before cooking. A machine readable element associated with the package or meat may include one or more of the following types of information:

the type of food item: e.g., beef sirloin;
the mass/weight of the item: e.g., 500 grams;
the butchering date or aging time: e.g., 5 weeks;
the aging method: e.g., vacuum aging;
the desired final cooking temperature: e.g., approximately 55° C.; or
the desired doneness: e.g., medium.

The apparatus controller (e.g., processor 112) may determine, based on the information received, the amount of EM energy needed to be absorbed in each piece of meat, optionally using a look up table having information regarding the correlation between aging time, final temperature, and the degree of doneness.

Referring back to FIG. 1, interface 110 may include a barcode reader, an RFID reader, an LCD, a keypad, a touch screen, a GUI, a camera, a microphone, or any combination thereof. The interface may be a handheld device detachable from RF oven 108, or a fixed component integrated into RF oven 108. The interface may acquire information from machine readable element and/or received instructions from a user and/or receive information stored at a remote location via various communication means, such as wired or wireless network, direct link, Bluetooth, telecommunication network, or any other suitable communication methods.

In some embodiments, packaging 102 may include a box-shaped structure made of or including paper, plastic, metal foil (partially), or a combination thereof, or any other suitable materials for enclosing or partially enclosing food item 104. Packaging 102 may also include vacuum bag, air tight bag, zipper bag, glass bottle, plastic bottle, or anything other suitable forms of enclosure for isolating food item 104 from outside air, water, and/or solid matter. Food item 104 may be enclosed or partially enclosed by packaging 102, or may be attached to, stuck on, tightened together with, or associated with packaging 102 in any other suitable manners.

Similarly, tag 106 may be associated with packaging 102 in any suitable ways. For example, tag 106 may be printed on, attached to, or embedded in, the packaging 102. In some embodiments, tag 106 may be machine readable. For example, tag 106 may be a barcode, a RFID tag, or a combination thereof.

In some embodiments, tag 106 may include information for use by processor 112 in determining instructions for electromagnetically cooking food item 104. The information may be stored in a storage area (not shown) of the tag, for example, in the form of one or more codes, digits, numbers, letters, or a combination thereof. Alternatively or additionally, the information may be built in to a circuit associated with the tag. For example, a resonant circuit may be constructed and associated with the tag, which contains information such as one or more resonant frequencies/wavelengths due to the electric characteristics of the circuit itself. In any event, such information may be read by RF oven 108, e.g., through interface 110, and may be processed by a processor (e.g., processor 112) to determine cooking instructions.

In some embodiments, the information may include one or more values configured to enable processor 112 to determine an amount of energy to be supplied to food item 104 for cooking. For example, the information may include a value representing the type of food item 104. In this case, different types of food may be associated with distinct numbers or codes, which may be predetermined and/or pre-programmed in system 100. Alternatively or additionally, different food types may be grouped together according to their common characteristics during RF cooking, and assigned a common code. An exemplary grouping may be found in Table 1. In addition to the food types, cooking protocols, such as slow cooking and required doneness shown in Table 1, may also be included in the information. In some embodiments, the information may include values representing the mass or weight of the food item.

By way of example, tag 106 may include a 16-digit binary code divided into three sections. The first section, comprising 4 digits, may represent the 16 food groups in Table 1. The second section, comprising 4 digits, may represent up to 16 cooking protocols. The third section, comprising the last 8 digits, may represent the mass/weight of the food item. For example, up to 256 mass/weight values may be encoded. If the range of mass/weight value is from 0 to 2.5 kg, then the resolution may be as high as about 0.01 kg. Of course, fewer or larger number of digits and/or sections may be used, depending on the actual needs, costs, and/or design considerations.

In some embodiments, the information may include one or more values representing the required amounts of energy. It is noted that the value(s) included in the information may not be the same as the actual amount(s) of energy required to cook the food item. Rather, the value(s) may be an encoded version and have mapping relationship with the actual amount(s) of energy.

By way of example, tag 106 may include a 19-digit binary code divided into two sections. The first section may include 11 digits representing up to 2048 different energy values. Such energy values may range from, for example, 100 to 2148 kJ/kg, with an incremental step of 1 kJ/kg. The second section may include 8 digits representing mass/weight, similar to the example discussed above. In this case, instead of determining the correct amount of energy from a lookup table (such as Table 1) using food type and cooking protocol, the processor may obtain such energy amount from the information read directly from the tag.

In some embodiments, food item 104 may include substantially raw meat, such as beef, pork, lamb, chicken, duck, turkey, etc. Under such conditions, the amount of energy to be supplied to the food item may be less than about 2000 kJ/kg. In another embodiment, food item 104 may include substantially uncooked dough. In yet another embodiment, food item 104 may include one or more vegetables. Other food types may also be included in food item 104. In some embodiments, the maximum amount of energy to be supplied to the food item may be less than about 1600 kJ/kg.

In some embodiments, the food item may include more than one food component. Each food component may correspond to a respective required amount of energy. In this case, the processor may determine the total amount of energy to be supplied to the food item.

In some embodiments, the information included in the machine readable element may be configured to authenticate the cooking instructions. For example, the information may include a specific code that represents the identity of the packaged food item. Upon receiving a cooking request and acquiring the information, the processor may first verify the specific code to determine if the packaged food item is produced, distributed, and/or sold by authorized entities. If the authentication process is passed, the cooking process will then begin. Otherwise, the processor may refuse the cooking request.

In some embodiments, the food item may be frozen (e.g., frozen chicken, fish, pizza, or any other type of frozen food). The information contained in the tag may be configured to instruct the RF oven to thaw the food item prior to cooking.

In some embodiments, the information may be configured to cause the processor to prompt a user for additional instructions during cooking process. One or more aspects related to the cooking may be selected and/or input by the user. For example, a food item including beefsteak may require the user to select desired doneness. In this case, information included in the tag may be configured to inform the processor to prompt a message (e.g., a display, sound, or the combination thereof) to notice the user. The user may then input or select desired cooking option through the interface and the processor may carry on the cooking process based on the user's input.

In some embodiments, the machine readable element may be configured to be rendered nonfunctional upon exposure to electromagnetic energy during the cooking process. For example, the machine readable element may contain heat-sensitive material that causes the information included therein to be erased or destroyed upon exposure to heat during a cooking process. Additionally or alternatively, the machine readable element may include a circuit sensitive to heat or electromagnetic radiation, and as a result of the cooking process, the circuit may be rendered inoperative. Optionally, the machine readable element may be configured to reveal information upon exposure to RF heating (e.g., the cause of thermal energy to be developed in an object due to RF energy absorption by the object). For example, the machine readable element may contain heat-sensitive material that becomes visible upon exposure to RF heating. The machine readable element may initially reveal partial information relating to a first cooking or operation step. To complete cooking, additional information may be revealed at a later stage.

Food items containing water, proteins, carbohydrates, and fat may be cooked by increasing the temperature of the food to a desired degree. For example, proteins are cooked by heating the food to a desired temperature to achieve denaturation. Thus, when the coldest part of the food reaches the desired temperature, cooking may be stopped. For example, a steak, cooked in an oven or barbeque grill may be ready when its interior part reaches a target temperature corresponding to a certain degree of doneness, e.g., 55-60° C. for medium or 75° C. for well-done. In an RF oven, beef may receive the exact amount of energy needed to heat the entire steak to the desired degree of doneness, see Table 1. This cooking protocol may relate to all types of meat and fish. It may also be applicable for baking (cakes, breads, pies and the like), because the carbohydrates in baking (e.g., flour) do not contain pectin, only starch, and do not require additional energy for softening.

Figure 3:
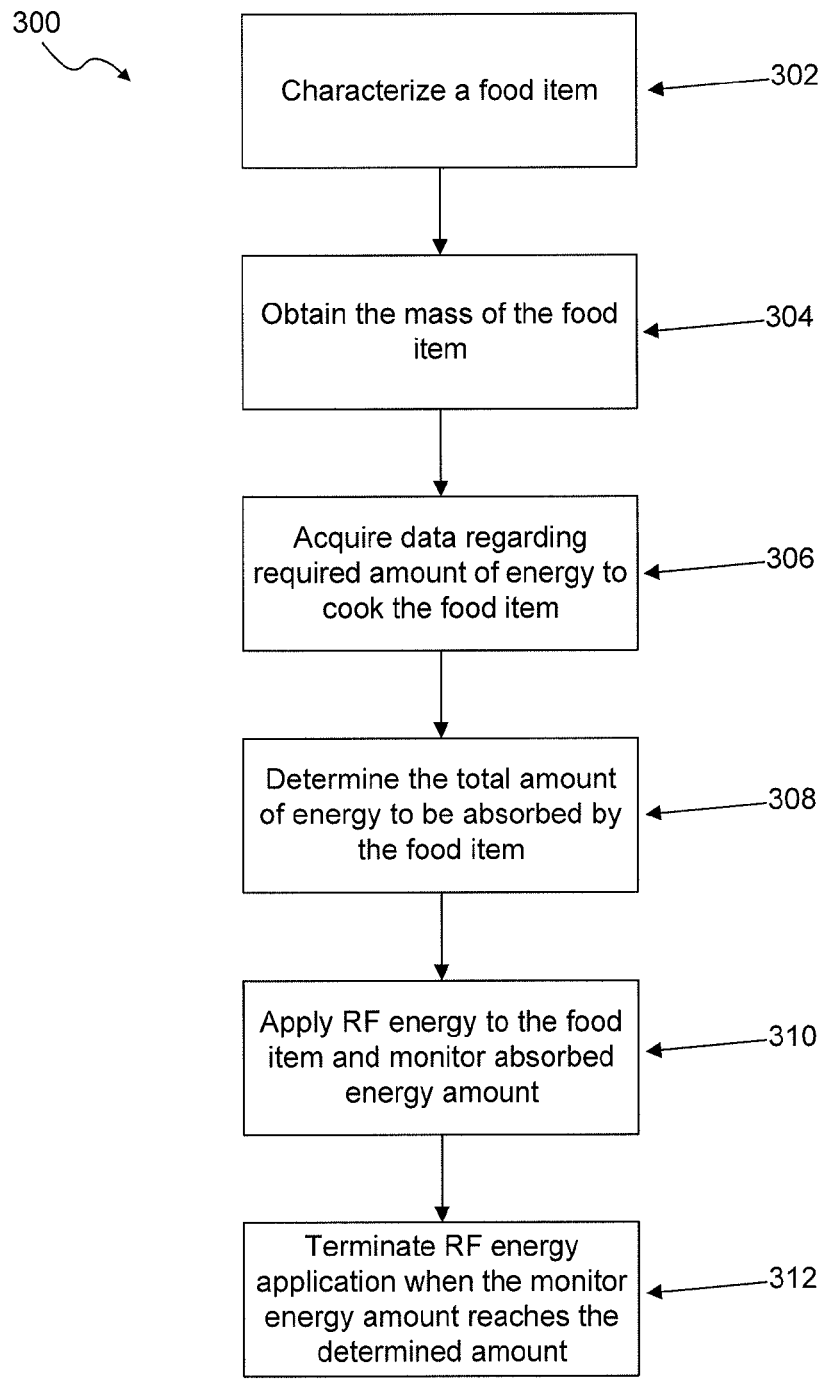
FIG. 3 provides an exemplary flow chart of a method for cooking food items using an RF oven, in accordance with some exemplary disclosed embodiments.

Some embodiments of the invention may include a method for cooking a packaged food item using an RF oven to reach a final desired temperature. Such a method may be accomplished, for example, through at least one processor implementing a series of steps of process 300 such as the one set forth in the flow chart of FIG. 3.

In step 302, the processor may receive food-identifying information characterizing at least one food item to be processed (e.g., cooked, thawed, heated, etc.). For example, processor 112 may receive such information through interface 110. The food-identifying information may include food type, food group (e.g., exemplary groups in Table 1), food mass, amount of energy absorption per unit mass, or other information characterizing a food item. The food item, while in singular form, may contain one or more different food items (e.g., food components or ingredients). The processor may receive information of one or more of such food items. In some embodiments, the processor may control the cooking process based on one or more major food items or food components if the food item contains a plurality of food items. For example, a food item may contain beef, potato, and some spices. The processor may control the cooking process based on the characteristic information of the beef and potato, which constitute the major part of the food item, and ignore the spices. The information receiving step may be implemented by reading a barcode using a barcode reader, reading an RFID tag using an RFID tag reader, taking a picture of the packaged food item and analyzing the image, receiving input from a GUI, keypad, keyboard, or touch screen, analyzing voice recorded from a microphone, or any other suitable methods. In some embodiments, food-identifying information may include a tag ID, e.g., identification of a barcode tag, an RFID tag, or any other information identifying a tag. Food-identifying information may be used to infer other data, for example, mass/weight data, food type, food group, amount of energy absorption per unit mass, or other information characterizing a food item.

In step 304, the processer may also obtain the mass/weight of the food item. As used herein, the "mass" of a food item may include any measures associated with the quantity of matter that the food item contains, such as "weight," "heaviness," etc. For example, the processer may acquire the mass information from the tag associated with the food item. Alternatively or additionally, the processor may obtain the mass information through measurement. Optionally, the mass may be indicated by the user via the interface. For example, a scale or sensor (e.g., mass/weight sensor) may be provided in the cavity of the RF oven to enable determination of the mass/weight of the food item.

In step 306, the processor may acquire data regarding the required amount of energy to cook the food item (the amount of energy needed to be absorbed by the food item, as calculated by the processor from EM feedbacks detected by detector(s) 120). As discussed above, such data may be acquired through reading the information included in the tag. The required amount of energy may be determined from food type/group and desired cooking protocol. The required amount of energy may be determined from food type/group and/or the food item mass information. Alternatively, the amount of energy may be directly read from the tag. Such an energy amount, e.g., in the unit of kJ/kg, indicates the energy per unit mass required to cook the food item to achieve a desired heating result. It is noted that although the cooking process may also be referred to as a "heating process," such a heating process is broadly defined as a process involving heat transfer, and, therefore, may or may not result in a temperature increase.

In step 308, the processor may calculate the total amount of energy to be absorbed by the food item. The total amount of energy required to cook the food item may be calculated by $E=\Sigma E_i \times M_i$, where E is the total energy, $E_i$ is the energy per unit mass for the $i^{th}$ food item, and $M_i$ is the mass of the $i^{th}$ food item.

In step 310, the processor may control the RF power source to apply electromagnetic energy to the food item using one or more MSEs. For example, RF energy may be applied using one or more frequencies. The processor may monitor the amount of energy absorbed by the food item, e.g., at each MSE. For example, the absorbed energy may be determined by subtracting the reflected energy and coupled energy from the incident energy. The monitored absorbed energy may include the energy loss due to the radiating elements, cavity, and/or other structures other than the food item, such as a container or packaging. Those losses may be substantially constant in every cooking, using the same oven (for example for all ovens from the same type/series, etc.) and the same package. In some embodiments the losses in the package or the mold may be negligible using a package with low losses, for example: paper, various plastics, etc.

In step 312, the process may terminate the heating process (RF energy application) if the monitored energy amount, which represents the energy absorbed by the food item, reaches the total energy amount to be absorbed by the food item determined in step 308, thereby finishing the cooking process.

Vegetables contain different amounts of carbohydrates, and in vegetables, several types of polysaccharides, such as pectin and starch, need to absorb moisture in order to "soften." Also, several meat or beef type foods require slow-cooking, like the neck of cow that contains fibers that needs to be disassociated for the beef to soften. Therefore, certain cooking protocols in accordance with exemplary disclosed embodiments may include additional time for "softening." In these protocols, the food may be warmed up to a certain temperature and then kept in the RF oven for an additional period of time.

In RF cooking, the additional time period may be replaced with additional energy. In certain embodiments, there may be a correlation between the amount of energy needed to heat up the food and the amount of energy needed for "softening." For example, if a certain food type requires X amount of energy to reach the cooking temperature, the total cooking energy may be a function of X, for example, a multiplication of X by a fixed value n, where n may be, for example, 2, 2.5 or 3. Table 2 presents several of such correlations, taken from various cooking experiments conducted in prototype RF ovens.

TABLE 2

| Food type | Cooking potocol | Energy for heating up [kJ/kg] | Energy for softening [kJ/kg] | Total energy [kJ/kg] | n |
|---|---|---|---|---|---|
| Beef, veal, ostrich tenderloin, and lamb | Slow cooking | 750 | 750 | 1500 | 2 |
| Potatoes, sweet potatoes and the like (turnip, carrot, garlic) | | 350 | 350 | 700 | 2 |
| Cabbage, cauliflower, broccoli, mushrooms | Al dente | 500 | 500 | 1000 | 2 |
| | Medium | 500 | 750 | 1250 | 2.5 |
| | Over cooked | 500 | 1000 | 1500 | 3 |
| Beet | | 400 | 800 | 1200 | 3 |

In one experiment, 450 gr. of potatoes, sliced to eighths were baked in an RF oven. The amount of energy that was required to cook the potatoes in each of the heating and softening stages was 0.45*350=157.5 kJ. Temperature measurements were performed before cooking, after the heating stage, and at the end of cooking. In the heating stage, the temperature increased from 22° C. to 83° C. (ΔT=61° C.). During the softening stage, the temperature increased only by an additional 19° C. (from 83° C. to 101° C.) although the same amount of energy (157.5 kJ) was absorbed by the potatoes.

Figure 4A:
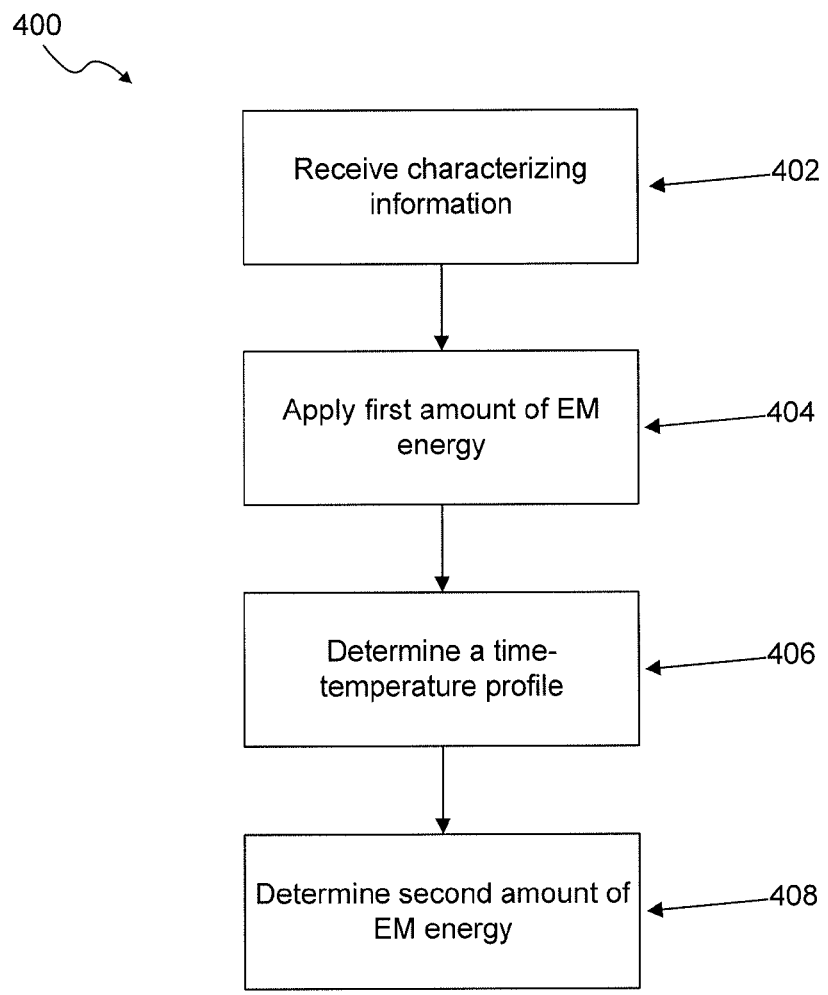
FIG. 4A provides an exemplary flow chart of a method for cooking food items using an RF oven, in accordance with some exemplary disclosed embodiments.

In accordance with some embodiments of the invention, RF oven 108 may be configured to perform a heating and softening process in accordance a method 400, shown in FIG. 4A. Using this method, the processor may determine a time-temperature profile, such as profile 420 shown in FIG. 4B, and may cause an additional heating process based on the time-temperature profile. The time-temperature profile may include one or more indicators of a time needed to reach a given temperature, a rate of temperature change over time (or an average rate thereof) or a combination of several rates/functions showing a relation between time and temperature.

In step 402, the processor (e.g., processor 112) may receive characterizing information related to an object (e.g., food item) to be processed. Similar to method 300, such characterizing information may include food type, food group (e.g., exemplary groups in Table 1), food mass, amount of energy absorption per unit mass, or other information characterizing a food item.

In step 404, the processor may control or cause power source 114 to apply RF energy such that a first amount of EM energy may be dissipated in the object based on the characterization information, or at a predetermined amount regardless of the characterizing information (e.g., food type), or based on any other methods that may define the first amount of energy. In this step, the processor may perform a monitoring process similar to step 310. In addition, the processor may also record a temperature change of the object during this heating step. The temperature change may be detected by any temperature sensor (i.e., a thermometer). For example, one or more thermocouple may be located at various locations in the object; an IR camera may be configured to measure the surface temperature of the object; a wireless thermometer may be placed in zone 116, etc.

Figure 4B:
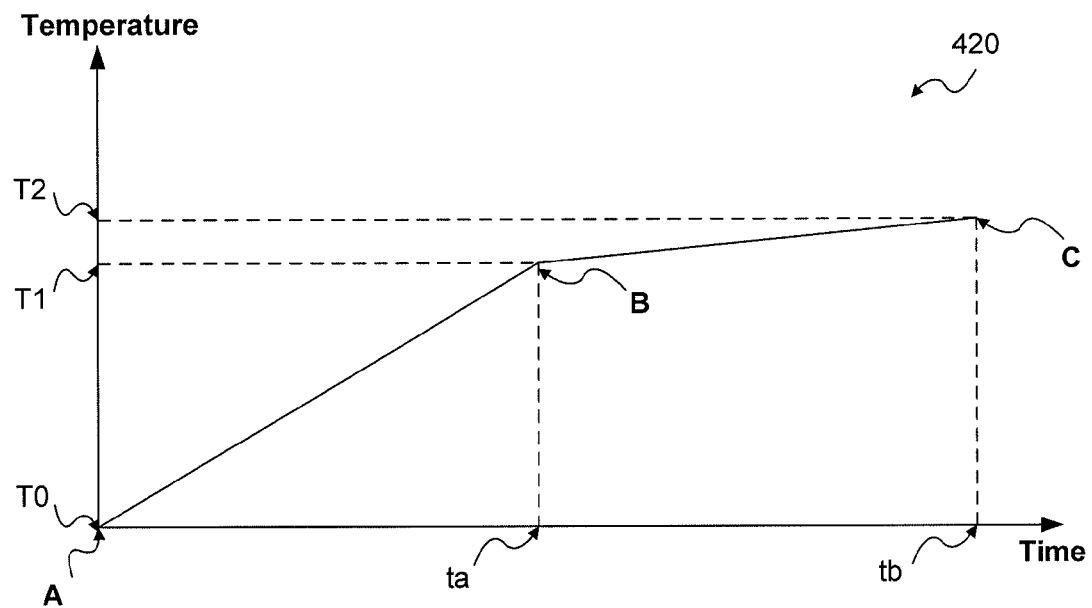
FIG. 4B illustrates an exemplary time-temperature profile and an exemplary time-energy profile, in accordance with some exemplary disclosed embodiments.
Figure 4B:
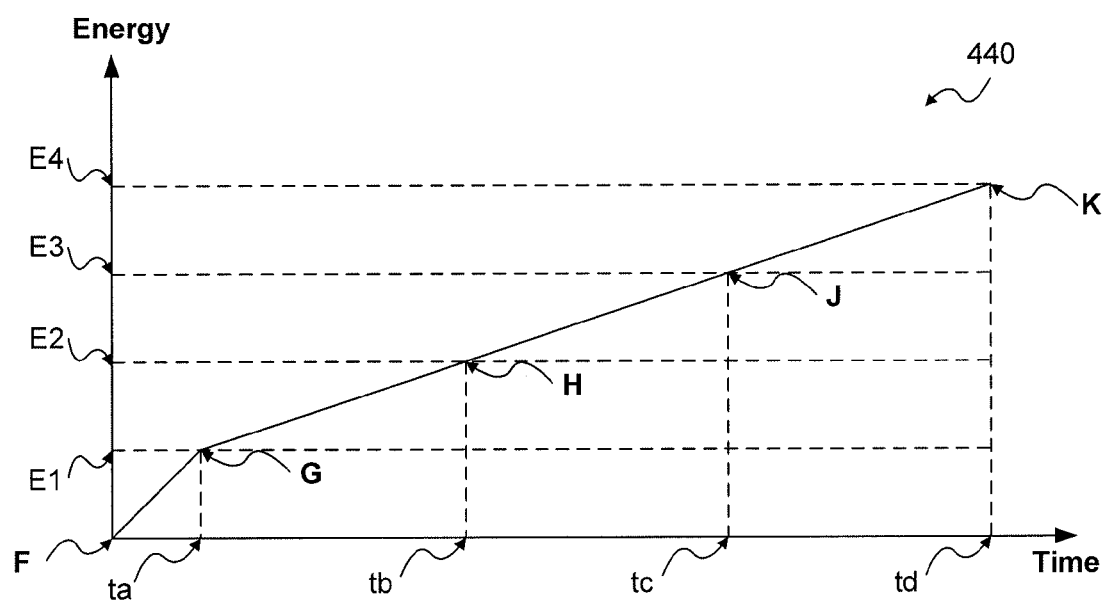

In step 406, the processor may determine a time-temperature profile associated with the object resulting from the absorption of the first amount of energy to the object. For example, FIG. 4B shows an exemplary time-temperature profile 420. In profile 420, point A represents the starting point of the heating process, where the temperature of the object is T0 and time is 0. After the first amount of energy is supplied, the time advances to ta and the temperature increases to T1, and the profile arrives at point B. The time-temperature profile defined by the curve between A and B may be determined by the processor. For example, the processor may monitor the temperature of the object at fixed time intervals and save the time values and temperature values in a memory during the first heating process. Then, in step 406, the time values and temperature values stored in the memory may be accessed by the processor to determine the time-temperature profile. Alternatively, temperature may be measured before and after the first heating process. That is, temperature may be measured only at points A and B, and the profile may be represented by a temperature change T1-T0.

In step 408, the processor may determine a second amount of energy to be dissipated in the object to achieve a predetermined and/or desired processing result based on the first amount of energy dissipated in the object, the characterization information related to the object, and/or the time-temperature profile. As used herein, the predetermined and/or desired processing result may include, for example, reaching a certain temperature; absorbing a certain amount of energy; heating for a predetermined time; achieving a desired degree of doneness (rare, medium, well done, etc.), level of browning, degree of softness, etc.; or any other desired and/or predetermined outcomes that may resulting from energy dissipation. For example, a food item may be heated up to a certain temperature during the first heating period, such as from temperature T0 to T1, as shown in time-temperature profile 420 of FIG. 4B. During the same time period, an amount of energy E1 was absorbed by the food item, corresponding to the curve from point F to G in time energy profile 440 of FIG. 4B. At time ta (or earlier, based on the slope and the know temperature T1), an additional amount of energy to be absorbed by the food item for softening may be determined by the processor, based on the current temperature T1 and absorbed energy E1. Based on the characteristics of the food item, including the food type and/or desired doneness, a second amount of energy may be determined as required to achieve the softening result. For example, the second amount of energy may be substantially the same as the first amount of energy, such as point H corresponding to E2=2*E1 at time tb, therefore the second amount of energy ΔE=E2−E1=E1. Alternatively, the second amount of energy may be a linear function of the first amount of energy, such as points J and K, corresponding to E3=3*E1 and E4=4*E1, at times tc and td, respectively. Therefore, for the second amount of energy, ΔE=2E1 and 3E1, respectively. The temperature increase, such as ΔT=T2−T1, may not be as large as T1−T0, as shown in point C of profile 420 in FIG. 4B. It is noted that the time-temperature profile A-B-C (420) may not necessarily be linear and that point tb may not be similar for points H, J, and K. If the temperature T1 is reached before ta, then the second amount of energy may be a sum of the amount of energy needed to reach ta and the amount needed for the second slope shown in FIG. 4B, e.g., the slope defined by points H, J, and K.

In some embodiments, the processor may be configured to cause supply of the second amount of energy to the object using EM energy applied in a plurality of MSEs. As discussed above, the processor may control the RF power source to modulate the frequency, phase, and amplitude of EM waves. In this case, one or more MSEs may be selected to supply the EM energy during the second energy delivery process. For example, the processor may control the oscillator to output EM waves at a plurality of frequencies.

In some embodiments, the temperature T1 at point B of FIG. 4B may be a target temperature, and energy may be supplied during the first heat process until the target temperature is reached. Thereafter, the second amount of energy delivery may be a linear function of the first amount. For example, the second amount may be 1, 2, 2.5, or 3 times of the first amount in order to achieve softening.

In some embodiments, the object to be heated may include raw meat. In another embodiment, the object may include a starchy food item. In yet another embodiment, the object may include uncooked legume item. In yet another embodiment, the object may include vegetables.

Figure 4C:
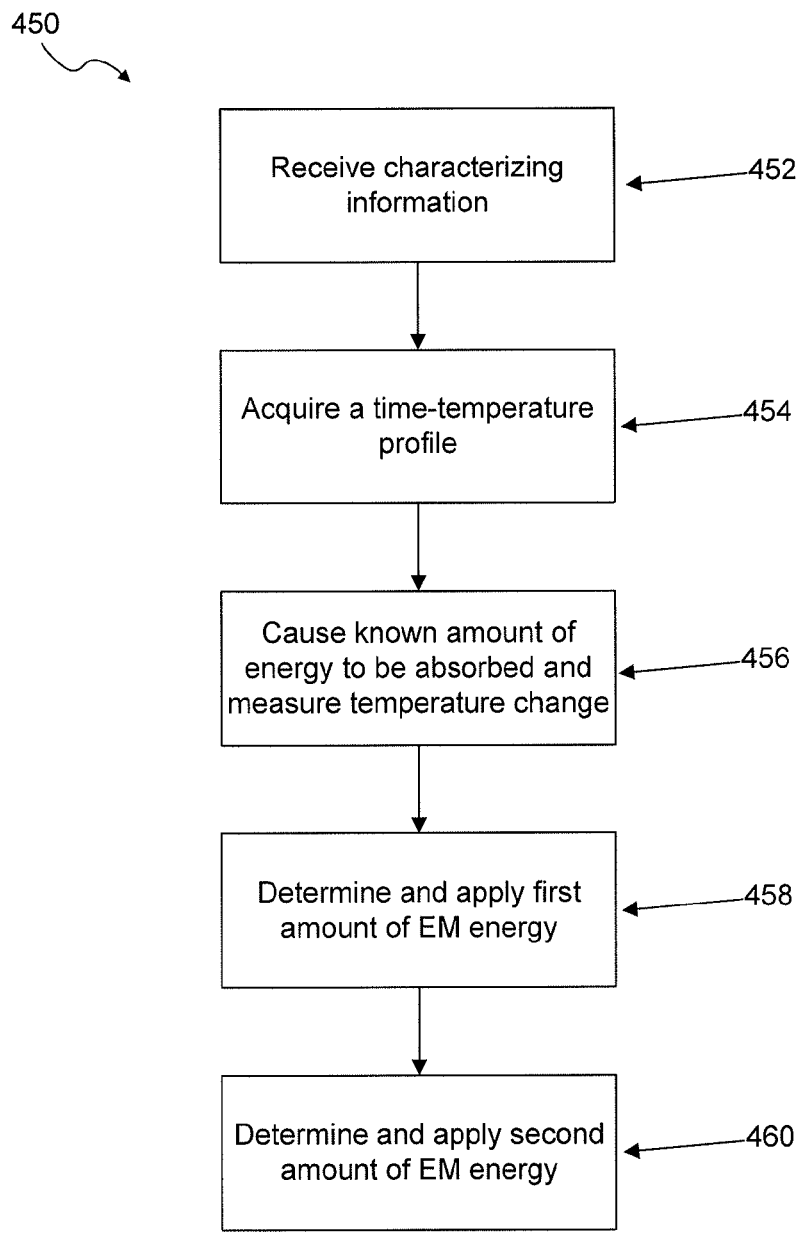
FIG. 4C provides an exemplary flow chart of a method for cooking food items using an RF oven, in accordance with some exemplary disclosed embodiments.

In some embodiments of the present invention, RF oven 108 may also be configured to perform a heating and heating maintenance process in accordance with method 450, shown in FIG. 4C. Using this method, the processor may acquire a time-temperature profile, such as profile 420 shown in FIG. 4B, then conduct first and second heating processes based on the time-temperature profile. It is noted that method 450 may also be used for softening food items.

According to this method, in step 452, the processor may receive characterizing information, e.g., via the interface, similar to step 402. Then, in step 454, the processor may acquire a time-temperature profile for heating the object. The time-temperature profile may include a temperature increase segment and a substantially constant segment. For example, curve A-B-C shown in FIG. 4B illustrates such a profile, where the temperature increase segment A-B has a relatively larger slope and the substantially constant segment B-C has a significantly smaller slope. Such profile may be acquired via the interface, or the information associated with the profile may be partially acquired via the interface and partially determined by the processor. In some embodiments, the profile may be recorded in a memory associated with the processor, and acquired from the memory upon request.

In step 456, the processor may control the RF power source to deliver RF energy such that a known amount of energy to may be absorbed by the object and measure the temperature change due to the energy delivery. For example, the processor may regulate the RF power source to supply EM energy at one or more MSEs with known energy, and control a temperature detector to measure the temperature change.

In step 458, the processor may determine a first amount of EM energy to be applied to the object in order to achieve temperature increase according to the temperature increase segment of the time-temperature profile. Such determination may be based on the characterizing information, the measured temperature, and the amount of energy that is absorbed (in step 456). For example, the known amount of energy supplied to the object and the temperature change measured in step 456 may be used to predict the first amount of energy needed to heat the object to a target temperature, such as T1 in FIG. 4B. The processor may then control the RF power source to apply the determined first amount of energy to the object in order to increase its temperature. In some embodiments, the first step is done by measuring the amount of energy that was applied during an initial portion of the first segment and calculation based thereon of the first amount of energy.

In step 460, the processor may determine a second amount of EM energy in order to achieve the constant segment of the time-temperature profile and to heat the object to a target temperature, such as T2, based on the energy absorbed by the object and the temperature change measured in step 456. This step is similar to step 458. Thereafter, the processor may control the RF power source to apply the determined second amount of energy to the object. Similar to method 400, the second amount of energy may be a linear function of the first amount. In some embodiments, the second amount may be substantially equal to the first amount.

At times, the total amount of energy needed for cooking food item having two or more major ingredients with different energy requirements for cooking (e.g., that do not mix to form a homogeneous mixture) may be calculated as the sum of energies required to cook each of the ingredients separately. For example, in order to convert or translate a conventional recipe for cooking, for example, salmon with broccoli and garlic, knowing the mass/weight (W in kg) of each ingredient, and using the data from Table 1, the total amount of energy will be:

$$E_{total}[kJ]=W_{salmon}*350\ [kJ/kg]+W_{broccoli}*1000\ [kJ/kg]+W_{garlic}*700\ [kJ/kg]. \quad (3)$$

Figure 5:
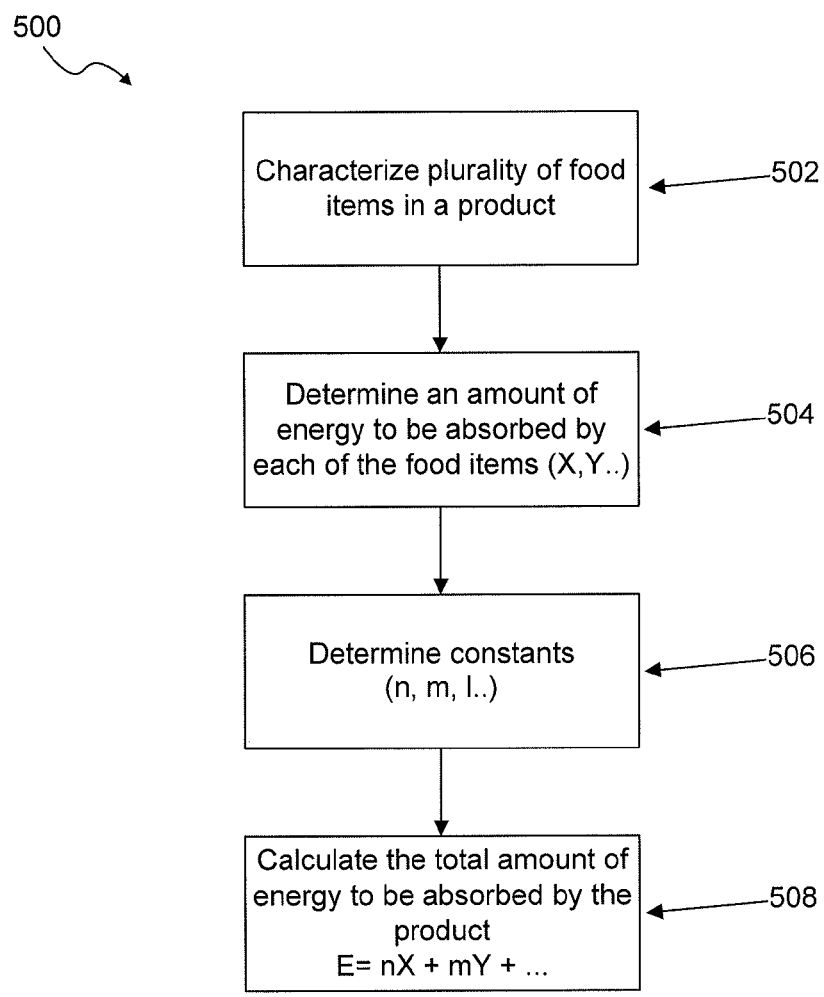
FIG. 5 provides an exemplary flow chart of a method for cooking food items using an RF oven, in accordance with some exemplary disclosed embodiments.

Based on the principle discussed above, an RF oven may be configured to heat at least two food items or food components simultaneously. As used herein, the food items may include food components and/or food ingredients. The at least two food items may belong to different food groups, such as the groups shown in Table 1. The RF oven may include an interface, a processor, and an RF power source, as illustrated in FIG. 2A. The processor may be configured to perform method 500 shown in FIG. 5, in accordance with some embodiments of the invention.

In step 502, the processor may receive information characterizing a plurality of food items or food components to be heated. Such a receiving step is similar to, for example, step 402. In some embodiments, the information received, e.g., via the interface, characterizing the plurality of food items or food components may include food groups associated with each of the plurality of food components or items, and wherein the food groups are selected from proteins, vegetables, dairy, and starches.

In some embodiments, a total amount of energy ($E_{total}$) to be absorbed to the plurality of food items can be represented by formula (4):

$$E_{total} = nX + mY + lZ \qquad (4)$$

where n, m, l, . . . are non-zero constants, X, Y, Z . . . correspond to an amount of energy to be absorbed by each of the plurality of food items. For example, in step 504, the processor may determine an amount of energy to be absorbed by each of the food items (X, Y, . . . ), for example according to steps 302, 304 and 306 presented in FIG. 3. In some embodiments, X and Y may differ by no more than a factor of two.

In step 506, constants n, m, . . . , which may correspond to the mass/weight of each food item, may be determined. In some embodiments, n and m are substantially equal. In other embodiments, n and m are substantially equal to one. In yet other embodiments, n and m may differ no more than a factor of two.

In step 508, the total amount of energy to be absorbed by the food item may be calculated according to equation (4), e.g., $E_{total} = nX + mY + \ldots$ . Based on the calculated total amount of energy to be absorbed the processor may regulate the application of energy to the food item.

In some embodiments, the processor may be configured to regulate energy delivery to the food item such that each determined amount of energy is absorbed by the respective food item. For example, when there are two or more food items being cooked simultaneously and the amounts needed to cook them are different, the processor may control the RF power source to deliver different amounts of energy according to the required amounts of energy needed to cook these two or more food items. In some embodiments, there may be no direct control of which amount of energy goes into each food item. In other embodiments, heating may be performed with the goal of uniform dissipation, regardless of the specific amount of energy needed to cook each food type.

The principle of simultaneous cooking of multiple food items may also be extended to a prepackaged food item that comprises a container, a plurality of food items, and a machine readable element. Such a food item (e.g., food item 101) has been discussed previously in connection with FIGS. 1 and 2A. In some embodiments, the plurality of food items may be cooked without shielding. In other embodiments, the food items may all be present in the oven during the whole process of cooking. In some embodiments, information included in the tag or machine readable element may include spatial information indicative of a position of a plurality of food items, e.g., relative to a container. In some embodiments, the container may include at least one positioning element configured to aid in orientation of the container within a RF oven. For example, the container may include a mechanical structure which matches or mates with a counterpart structure in the RF oven.

Figure 6:
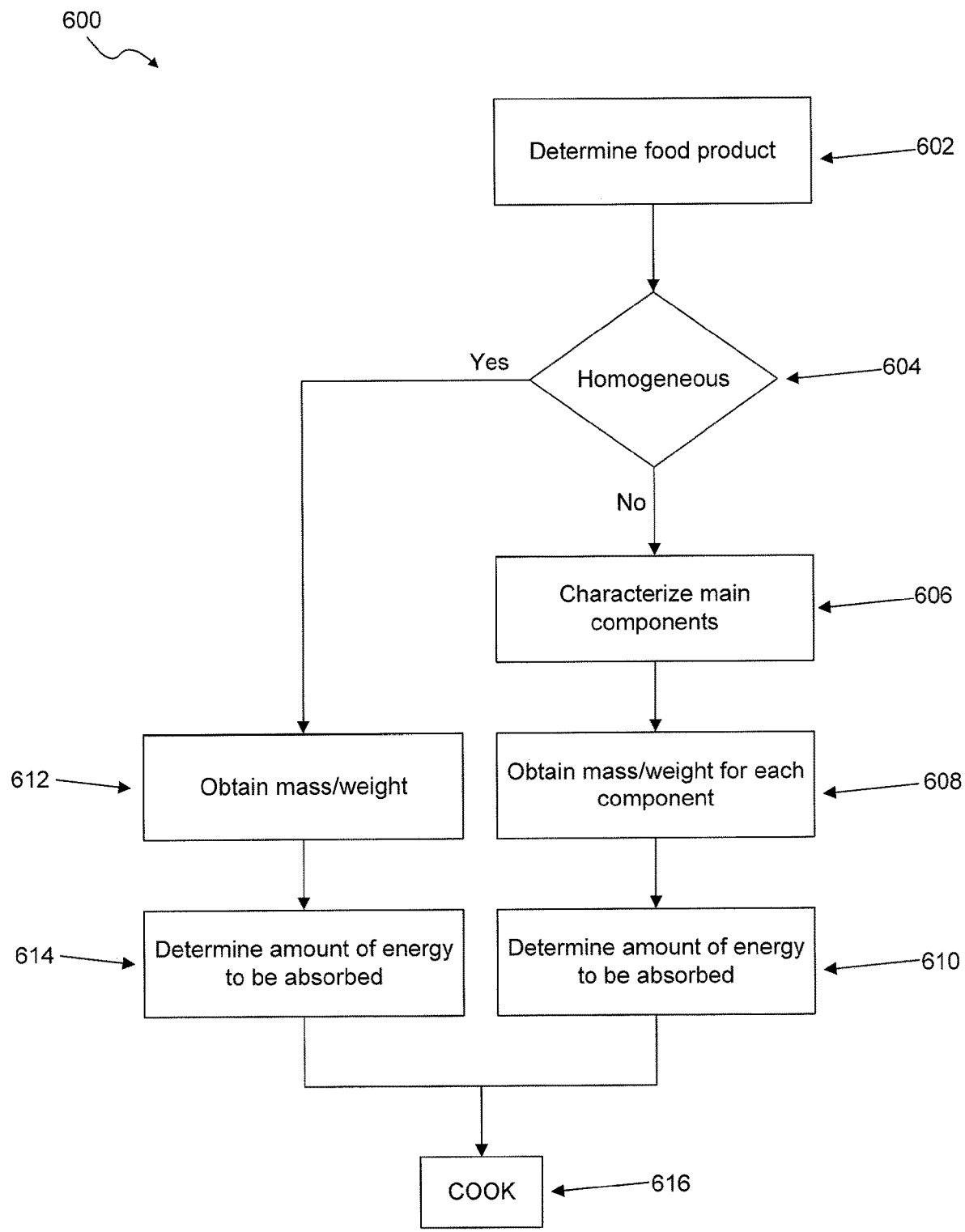
FIG. 6 provides an exemplary flow chart of a method for cooking food items using an RF oven, in accordance with some exemplary disclosed embodiments.

Referring to FIG. 6, the processor may be configured to perform the method 600 for cooking a food item using the RF oven, in accordance with some embodiments of the invention. In step 602, the processor may determine the type of food item and may receive characterizing information indicative, e.g., of whether the food item is substantially homogeneous. In addition, the processor may receive classification information identifying a food type associated with the food item, e.g., in order to determine the type of food item. Such characterizing information and classification information may be received through an interface. The interface may be remotely located with respect to the RF oven, or may be in the proximity of the RF oven.

In step 604, the processor may determine if the food item is substantially homogeneous. If it is (step 604: YES), then the process may continue to steps 612, 614, and 616, which are similar to steps 304, 308, and 310. If the food item is determined to be not homogeneous (step 604: NO), then the process may continue to step 606, where the main components of the non-homogeneous food item may be determined and characterized. Thereafter, in step 608, mass for each main component may be obtained (similar to step 304). And in step 610, the total amount of energy may be determined, according to equation (4) (similar to step 508). The process may finish at step 616, where the food item is cooked by absorbing EM energy, e.g., the processor may cause the RF power source to apply EM energy to the food item at a plurality of MSEs.

In some embodiments, all the methods discussed above may be used to convert conventional cooking instructions for any recipes from conventional cooking methods (e.g., cooking on a stove, backing/roasting in an oven, thawing/cooking in conventional microwave, etc.) to cooking using an RF oven. The processor may obtain (e.g., from a user or from website), a list of food ingredients needed for cooking a selected food item according to a recipe (e.g., the identity and the quantity (mass/weight) of each ingredient). The processor may further obtain one or more of desired cooking results, for example the degree of doneness of a roast beef, the level of browning of a turkey, etc. The processor may determine based on the list of ingredients using any one of methods 300, 500, and 600, or a combination of the one or more of the methods, and the amount of energy that needs to be dissipated in the food item, in order to achieve the desired cooking result.

In some embodiments, the processor may be configured to determine the amount of energy to be absorbed by the food item by accessing one or more look-up tables stored in a memory, such as Tables 1 and 2. The look-up table may be stored in a memory located in the processor or in immediate association therewith. Alternatively or additionally, the look-up table may be stored in a memory located at a remote location and acquired by the controller via various communication means, such as wired or wireless network, direct link, Bluetooth, telecommunication network, or any other suitable communication methods.

In the foregoing Description of Exemplary Embodiments, various features are grouped together in a single embodiment for purposes of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Description of the Exemplary Embodiments, with each claim standing on its own as a separate embodiment of the invention.

Moreover, it will be apparent to those skilled in the art from consideration of the specification and practice of the present disclosure that various modifications and variations can be made to the disclosed systems and methods without departing from the scope of the invention, as claimed. Thus, it is intended that the specification and examples be considered as exemplary only, with a true scope of the present disclosure being indicated by the following claims and their equivalents.

What is claimed is:

1. An apparatus for electromagnetically cooking a non-homogeneous food item composed of a plurality of different food components, the apparatus comprising:
   an interface; and
   at least one processor configured to:
   receive, via the interface, classification information including a plurality of food type identifiers identifying a food type associated with each different food component in the food item and also including a plurality of weight values identifying a weight value associated with each different food component in the food item;
   determine an amount of energy to be absorbed by the food item based on the plurality of food type identifiers and the plurality of weight values; and
   control at least one source of electromagnetic energy to deliver energy to the food item such that the determined amount of energy is absorbed by the food item.

2. The apparatus of claim 1, wherein the at least one processor is configured to:
   receive, via the interface, characterizing information indicating that the food item is non-homogeneous.

3. The apparatus of claim 1, wherein the processor is configured to determine the amount of energy to be absorbed by the food item by accessing one or more look-up tables stored in a memory.

4. The apparatus of claim 1, wherein the classification information is received by the interface from a user interface device.

5. The apparatus of claim 1, wherein the determined amount of energy to be absorbed by the food item is a total amount of energy $E=nX+mY+lZ\ldots$, where $n, m, l \ldots$ are non-zero constants; $X, Y, Z \ldots$ correspond to amounts of energy to be absorbed by respective main components of the inhomogeneous food item.

6. The apparatus of claim 1, wherein the source of electromagnetic energy is controlled to deliver energy and to allow the food item to absorb the determined amount of energy.

7. An apparatus for electromagnetically cooking a non-homogeneous food item composed of a plurality of different food components, the apparatus comprising:
   an interface; and
   at least one processor configured to:
   receive, via the interface, classification information including a plurality of food type identifiers identifying a food type associated with each different food component in the food item and also including a plurality of weight values identifying a weight value associated with each different food component in the food item;
   determine an amount of energy to be absorbed by the food item based on the plurality of food type identifiers and the plurality of weight values;
   control at least one source of electromagnetic energy to deliver energy to the food item;
   monitor an energy amount representing an amount of energy absorbed by the food item; and
   terminate energy delivery to the food item after the monitored energy amount reaches the determined amount of energy to be absorbed by the food item.

8. The apparatus of claim 7, wherein the at least one processor is configured to:
   receive, via the interface, characterizing information indicating that the food item is non-homogeneous.

9. The apparatus of claim 7, wherein the processor is configured to determine the amount of energy to be absorbed by the food item by accessing one or more look-up tables stored in a memory.

10. The apparatus of claim 7, wherein the classification information is received by the interface from a user interface device.

11. The apparatus of claim 7, wherein the determined amount of energy to be absorbed by the food item is a total amount of energy $E=nX+mY+lZ\ldots$, where $n, m, l \ldots$ are non-zero constants; $X, Y, Z \ldots$ correspond to amounts of energy to be absorbed by respective main components of the inhomogeneous food item.

12. The apparatus of claim 7, wherein the energy amount representing an amount of energy absorbed by the food item includes an energy loss due to structures other than the food item.

13. The apparatus of claim 7, wherein the source of electromagnetic energy is controlled to deliver energy and to allow the food item to absorb the determined amount of energy.

* * * * *